(12) United States Patent
Kalambe et al.

(10) Patent No.: US 12,299,003 B2
(45) Date of Patent: May 13, 2025

(54) SYSTEMS AND METHODS FOR DETERMINING ENTITIES INVOLVED IN MULTIPLE TRANSACTIONS

(71) Applicant: Walmart Apollo, LLC, Bentonville, AR (US)

(72) Inventors: Pallavi Kalambe, Bentonville, AR (US); John C. Danahy, Plymouth, MA (US)

(73) Assignee: WALMART APOLLO, LLC, Bentonville, AR (US)

( * ) Notice: Subject to any disclaimer, the term of this patent is extended or adjusted under 35 U.S.C. 154(b) by 224 days.

(21) Appl. No.: 17/738,696

(22) Filed: May 6, 2022

(65) Prior Publication Data

US 2023/0359648 A1   Nov. 9, 2023

(51) Int. Cl.
*G06F 16/28* (2019.01)
*G06F 16/215* (2019.01)
*G06F 16/25* (2019.01)

(52) U.S. Cl.
CPC .......... *G06F 16/285* (2019.01); *G06F 16/215* (2019.01); *G06F 16/258* (2019.01)

(58) Field of Classification Search
CPC .... G06F 16/285; G06F 16/215; G06F 16/258; G06F 16/1794
See application file for complete search history.

(56) References Cited

U.S. PATENT DOCUMENTS

| | | | |
|---|---|---|---|
| 10,235,633 B2 | 3/2019 | Tereshkov | |
| 2010/0010973 A1* | 1/2010 | Harrington | G06F 16/3343 707/E17.017 |
| 2010/0153396 A1* | 6/2010 | Margulies | G06F 40/295 707/E17.089 |
| 2010/0257006 A1* | 10/2010 | Quadracci | G06N 3/044 707/E17.046 |
| 2014/0298168 A1* | 10/2014 | Son | G06F 40/232 715/257 |
| 2015/0243278 A1* | 8/2015 | Kibre | G10L 15/187 704/243 |

(Continued)

OTHER PUBLICATIONS

Dannelöv, Johannes, "Study on Record Linkage regarding Accuracy and Scalability"; Umeå Universitet; 2018; pp. 1-23.

(Continued)

*Primary Examiner* — Kavita Stanley
*Assistant Examiner* — Cecile H Vo
(74) *Attorney, Agent, or Firm* — Fitch, Even, Tabin & Flannery LLP

(57) ABSTRACT

There are provided systems and methods for determining an entity involved in multiple transactions. The system may include at least one database containing transaction records. It further may include a control circuit that: receives data; creates a metaphone of entries in the records; creates a number of record pairs; compares the two records of each record pair a comparison value indicating a degree of similarity of the two records; and generates a probability that the two records involve the same entity. The control circuit may also iteratively apply different fields and variables in the records to determine that each record pair is either a match or a non-match and then link matched record pairs with other corresponding matched record pairs to determine an entity.

12 Claims, 31 Drawing Sheets

(56) References Cited

U.S. PATENT DOCUMENTS

| | | |
|---|---|---|
| 2016/0180245 A1 | 6/2016 | Tereshkov |
| 2018/0018960 A1* | 1/2018 | Anantaram ............ G10L 15/183 |
| 2019/0079937 A1* | 3/2019 | Manning ............. G06F 16/9535 |
| 2019/0188200 A1* | 6/2019 | Erenrich ............ G06F 16/24558 |
| 2019/0287116 A1* | 9/2019 | Karantzis ............ G06Q 20/4014 |
| 2020/0364243 A1 | 11/2020 | Tamayo-Rios |

OTHER PUBLICATIONS

Kim, Kunho, et al., "Financial Entity Record Linkage with Random Forests"; Pennsylvania State University; 2016; pp. 1-2.
De Bruin, Jonathan, "Record Linkage Toolkit Documentation"; Dec. 4, 2019; pp. 1-102.
"Entity Resolution: Efficiency and Scalability"; Duke Computer Science; 2017; pp. 1-27.

* cited by examiner

Transitive Linking 114

Matching based on Probability Score 112

ECM Classifier 110

Compare Vectors 108

Comparison Links 106

Unify and Standardize 104

Various Databases and Products 102

| Value 116 | Transformed Value 118 |
|---|---|
| Ellen Wilson | ALNLSN |
| Eileen Wilson | ALNLSN |
| Pauline Bedham | PLNPTM |
| Pauline Beedham | PLNPTM |
| Lewis | LS |
| Louis | LS |

FIG. 2

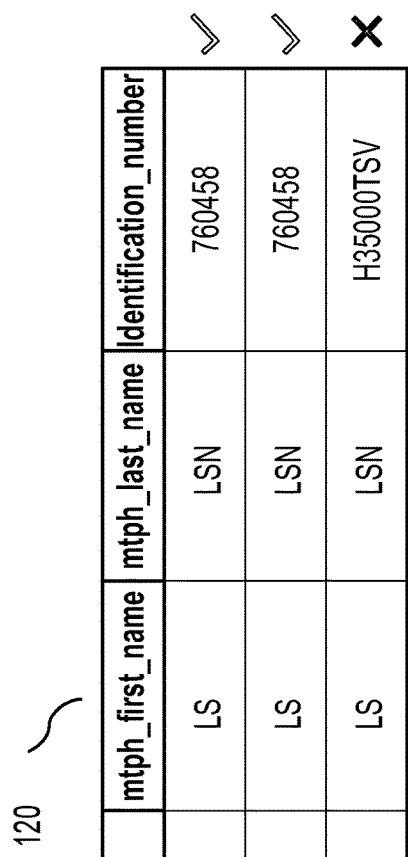
FIG. 3
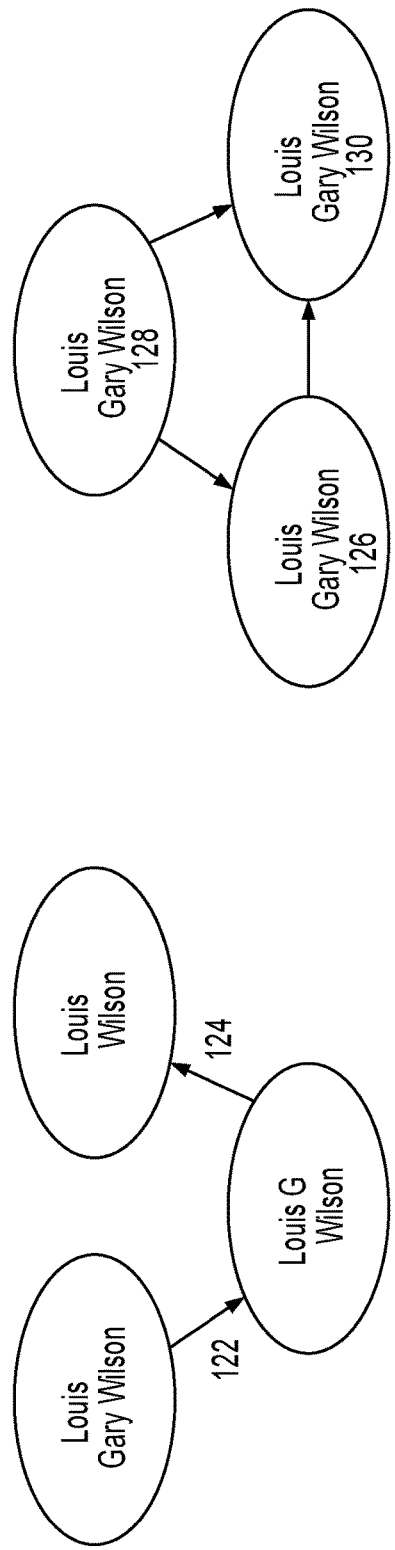
FIG. 5
FIG. 4

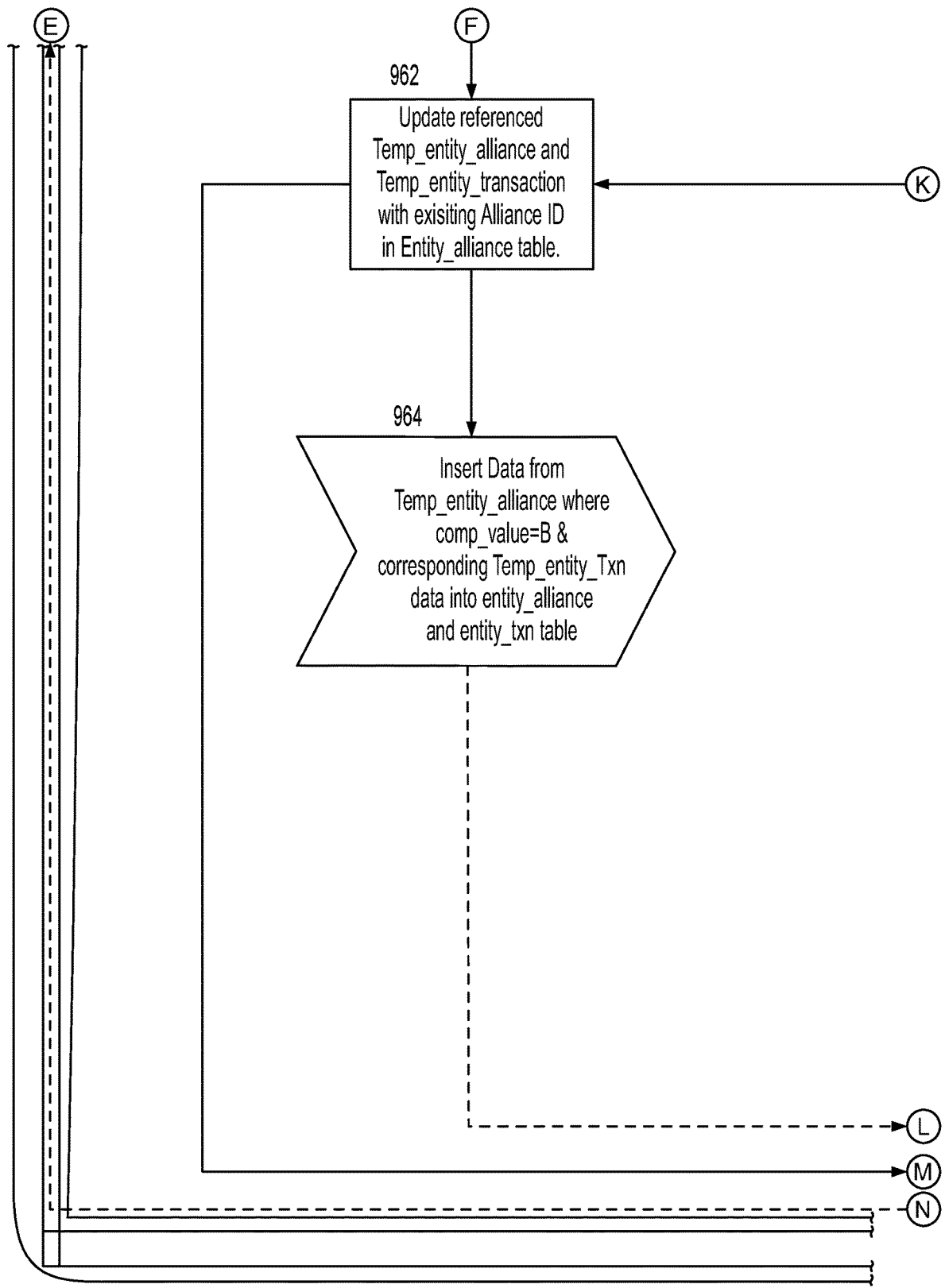

SYSTEMS AND METHODS FOR DETERMINING ENTITIES INVOLVED IN MULTIPLE TRANSACTIONS

TECHNICAL FIELD

This invention relates generally to identifying entities involved in multiple transactions, and more particularly, to identifying entities involved in financial transactions.

BACKGROUND

In certain settings, certain types of customer transactions may be stored in multiple databases. These customer transactions may include different fields of information, such as first name, last name, address, date of birth, etc. The customer transactions may also include slightly different entries for the same field of information. Thus, multiple transactions may appear to involve different customers or entities when, in fact, they actually involve the same customer or entity.

There is a need for identifying an entity that may be involved in multiple transactions where the transaction records are different or do not match exactly. This is especially true for financial transactions that may occur over a certain period of time. For such financial transactions, there may be some sort of rule or governmental regulation requiring reporting of financial transactions where the total amount of the transactions exceeds a certain amount during a certain time period. Accordingly, there is a need to identify an individual that is involved in multiple financial or other transactions, often under time constraints and with the minimal use of computational resources.

BRIEF DESCRIPTION OF THE DRAWINGS

Disclosed herein are embodiments of systems, apparatuses and methods for determining entities involved in multiple transactions. This description includes drawings, wherein:

FIG. 2 is a table in accordance with some embodiments;

FIG. 3 is a table in accordance with some embodiments;

FIG. 4 is a schematic diagram in accordance with some embodiments;

FIG. 5 is a schematic diagram in accordance with some embodiments;

Figure 1:
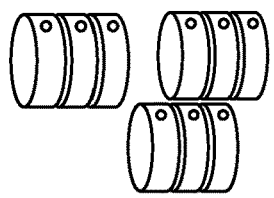
FIG. 1 is a schematic diagram in accordance with some embodiments.
Figure 1:
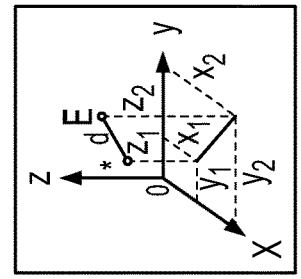
Figure 1:
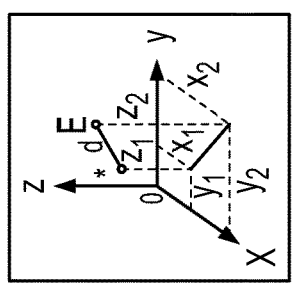
Figure 1:
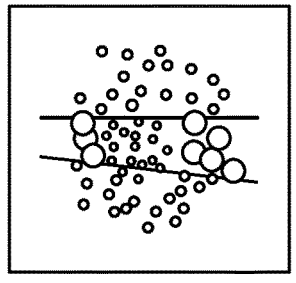
Figure 1:
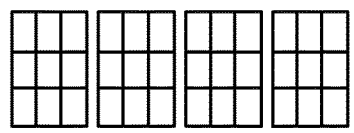

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for determining entities involved in multiple transactions. In one form, the system includes: at least one database containing a plurality of records corresponding to a plurality of transactions, each record including a plurality of fields relating to a nominal entity involved in the corresponding transaction; and a control circuit configured to: receive records from the at least one database, remove characters from a first set of entries in the records received from the at least one database, and generate standardized records for a second set of entries in the records; create a metaphone of at least one entry in each record, the metaphone approximating how at least part of the at least one entry sounds and applied to limit a total number of records being compared to one another; create a plurality of record pairs in which the two records in each record pair are to be compared against one another, a total number of record pairs being determined by predetermined blocking criteria to limit a total number of comparisons based on predetermined fields; compare the two records of each record pair against one another to produce a comparison value indicating a degree of similarity between the two records; and based on the comparison value, generate a probability that the two records of each record pair involve the same entity.

In some implementations, in the system, the control circuit is configured to: iteratively generate and compare record pairs, each iteration involving application of different predetermined blocking criteria corresponding to one or more fields to determine the record pairs; in each iteration, determine that each record pair is either a match or a non-match based on comparison of each probability to a predetermined threshold probability; and transitively link matched record pairs with other corresponding matched record pairs to determine a group of record pairs involving the same entity. In some implementations, the control circuit is configured to: assign a unique identifier for each different entity, the same unique identifier being assigned to each record in matched record pairs that are transitively linked to one another. In some implementations, the control circuit is configured to: identify all transactions corresponding to the same entity based on each unique identifier, the transactions being financial transactions; total the amount of the transactions corresponding to the same entity; and generate an alert when the total amount exceeds a predetermined threshold during a predetermined time period. In some implementations, the control circuit is configured to: determine a first subset of records with entries in first name, last name, address, and date of birth fields; apply first blocking criteria based on a metaphone of the first name, a metaphone of the last name, and date of birth; and perform a first iteration to generate a probability that two records of each record pair involve the same entity. In some implementations, the control circuit is configured to: determine a second subset of records with entries in first name, last name, and address fields; apply second blocking criteria based on the metaphone of the first name, the metaphone of the last name, and address; and perform a second iteration to generate a probability that two records of each record pair involve the same entity. In some implementations, the control circuit is configured to: determine a third subset of records with entries in first name, last name, and identification number fields; apply third blocking criteria based on the metaphone of the first name, the metaphone of the last name, and identification number; and perform a third iteration to generate a probability that two records of each record pair involve the same entity. In some implementations, the control circuit is configured to: determine a fourth subset of records with entries in first name, last name, identification number, date of birth, and address fields; apply fourth blocking criteria based on the metaphone of the first name, the metaphone of the last name, identification number, date of birth, and address; and perform a fourth iteration to generate a probability that two records of each record pair involve the same entity. In some implementations, the control circuit is configured to remove characters from name entries in name fields and to generate standardized address entries in address fields. In some implementations, the control circuit is configured to create a metaphone of a first name and a metaphone of a last name of each nominal entity involved in each corresponding transaction, the metaphones each being a maximum predetermined length or shorter and each approximating how part or all of the first and last names sound.

In another form, there is provided a method for determining an entity involved in multiple transactions, the method comprising, by a control circuit: accessing at least one database containing a plurality of records corresponding to a plurality of transactions, each record including a plurality of fields relating to a nominal entity involved in the corresponding transaction; receiving records from the at least one database, removing characters from a first set of entries in the records received from the at least one database, and generating standardized records for a second set of entries in the records; creating a metaphone of at least one entry in each record, the metaphone approximating how at least part of the at least one entry sounds and applied to limit a total number of records being compared to one another; creating a plurality of record pairs in which the two records in each record pair are to be compared against one another, a total number of record pairs being determined by predetermined blocking criteria to limit a total number of comparisons based on predetermined fields; comparing the two records of each record pair against one another to produce a comparison value indicating a degree of similarity between the two records; and based on the comparison value, generating a probability that the two records of each record pair involve the same entity.

As an overview, this disclosure is directed generally to identifying an individual involved in multiple transactions (such as financial transactions) where the individual's identifying information may be stored in database(s) in different ways. For example, one of the most significant challenges in financial transaction space is customer information integration. Every day, the same entities (customers) utilize various financial transaction products, like money transfers sent, money transfers received, money orders, gift cards, cash withdrawals, etc., using varied personally identifiable information (PII) across these products.

This disclosure provides a scalable solution to link these entities together and identify the individual by creating an umbrella view of customer PII so that it can be classified as one entity. It is generally contemplated that unsupervised machine learning algorithm(s) are utilized in order to perform the classification. The solution is potentially applicable to a wide range of space where PII data are available, but in one form, it may be utilized for customer transaction reporting (CTR) alert generation where an individual's financial transactions are greater than a certain threshold during a certain time period.

One goal is to find a solution to link PII data in order to capture entities and associate them together in such a way that can be applied to identify an individual. In one aspect, this solution may focus on CTR alerts for an individual with total cash credit or total cash debit above a certain threshold, such as, for example, about $10,000 a day. This disclosure seeks to speed up entity resolution while maintaining accuracy and also conserving computational resources. This approach is not necessarily limited to the financial transactions mentioned above and be used with other investigative analytics products (and in other areas) in order to perform entity analysis.

In one form, at a high level, the approach may ingest transaction data directly from product tables/databases to avoid any imputation performed on raw data. The approach may also compare the name variables based on a metaphone algorithm. This algorithm returns an approximation of how an English word sounds to avoid variations and inconsistencies in English spelling and pronunciation. The approach may also convert nonstandard addresses into standardized form to get into proper USPS address formats.

In addition, in one form, at a high level, the approach may generate a number of record pairs and then generate a comparison value (or vector) indicating a degree of similarity between the two records in each record pair. Resultant comparison vectors may be fed into an expectation classification maximization (ECM) binary classifier, which generates a probability of an entity match for each record pair. The approach may also include multiple modules operating in an iterative manner, each module analyzing a unique combination of variables/fields that are compared to generate a probability that two records of each record pair involve the same entity.

Referring to FIG. 1 there is shown a schematic diagram showing various stages in a system 100 for determining a single entity/customer involved in multiple transactions. It is generally contemplated that customer PII may be inconsistent across various records and/or various databases. Further, it is contemplated that different databases may have different types (or fields) of information making comparison difficult. It is desirable to link the different customer PII together to identify the single entity/individual.

Initially, various databases and products 102 may be accessed for transaction data. Data including PII information may be gathered from various sources and ingested for further processing. In one form, this data may constitute financial transaction data. For example, this financial transaction data may relate to or involve money transfers, bill payments, money orders, check cashing, gift card transactions, cash withdrawals, etc.

As part of the ingestion, the data may be cleaned and/or standardized 104. In one form, salutations (such as Mr., Ms., Jr., Sr., Dr., etc.) and non-alphabetical characters may be removed from the name variables (first and last name fields). Further, in one form, nonstandard customer/individual addresses may be processed to generate standardized addresses, such as, for example, via third party application programming interfaces (APIs). Also, each transaction might have multiple identification numbers associated with various identification types. The identification number and identification type variables may be transformed in some manner in order to perform one-to-one comparison at a later stage.

A metaphone generator may be used to facilitate comparison of names. In one form, metaphones of the first, last, and/or full names may be generated. The metaphone generator returns shorthand approximations of how English words sound. This conversion helps avoid disparities resulting from irregularities in English spelling and pronunciation. Examples of names that have been transformed from initial values 116 to transformed values 118 (metaphones) are shown in FIG. 2.

In one form, the system 100 includes a record pair builder stage 106. Record pairs may be created in order to perform record comparison. When large data sets are involved, the number of records and record comparisons will increase exponentially if all records are compared against each other. For example, a large volume might include 250,000-300,000 records per day. In order to avoid extensive record comparison complexity, blocking algorithms may be utilized to limit the number of record pairs that are compared to one another. Blocking generally uses certain variables/fields to limit the total number of comparisons required by limiting the number of records based on selected variables/fields. For example, a blocking criterion may be selected to be a metaphone of the last name, records having the same metaphone of the last name are disposed in the same block, and comparisons are only made of record pairs within each block.

In one form, the system 100 includes a comparison value/vector generator stage 108. Record pairs are compared against each other to produce a comparison vector indicating the degree of similarity between the two records in each record pair. It is generally contemplated that one of various methods to compare the similarities of string sequences may be used, such as, for example, the Jaro-Winkler distance method or the Levenshtein distance method. For character variables, comparing strings is computationally expensive, so in one form, it has been found desirable to use the Jaro-Winkler distance method.

In one form, the system 100 includes a classifier/probability generator 110. For example, the classifier/probability generator 110 may use an unsupervised machine learning approach based on an expectation classification maximization (ECM) algorithm, which assumes that the attributes are independent of each other. In this example, the resultant comparison vector may be processed through an ECM binary classifier which generates a probability score of each record pair being a match or not a match. In other forms, however, it is contemplated that a supervised machine learning approach may be used with training data for classification of record pairs into matches and not matches. Training data generally involves the use of data for which the true match status is known for each comparison vector. Here, it is contemplated that training data involving a large number of record pairs could be used as the true match status of the record pairs is known. Other examples of possible algorithms that might be used include Logistic Regression, Naïve Bayes, Support Vector Machines, and K-means clustering algorithms for classification.

In one form, the system 100 performs a matching determination stage 112. Based on comparison to a certain probability threshold, each record pair is classified as a match or not a match. For example, the threshold may be set at 90%, and all probability scores over 90% are determined to constitute a match. FIG. 3 shows a table 120 of three records indicating names, address, metaphones of names, assigned identification numbers, and whether the records match. At the linking stage 114, record pairs are directly linked and indirectly linked to one another in a transitive manner to establish a set of linkages defining a single entity. FIG. 4 shows that two record pairs 122 and 124 have been directly linked, and FIG. 5 shows that, based on this determination, all three records 126, 128, and 130 have been linked to one another.

In one form, it is contemplated that some of these stages may be performed in an iterative manner based on different variables/fields. For example, multiple modules may be executed to make one complete run of entity resolution of given data. Each record may be processed through each of the modules until assigned an identification number or code corresponding to an entity. Once assigned an identification number or code, the PII data may be stored in an entity table and the corresponding transactional data may be stored in a transaction table. New incoming records may be compared against the existing records and follow the preceding entity resolution steps above, and if they match, they may be assigned the existing identification number or code.

Figure 6:
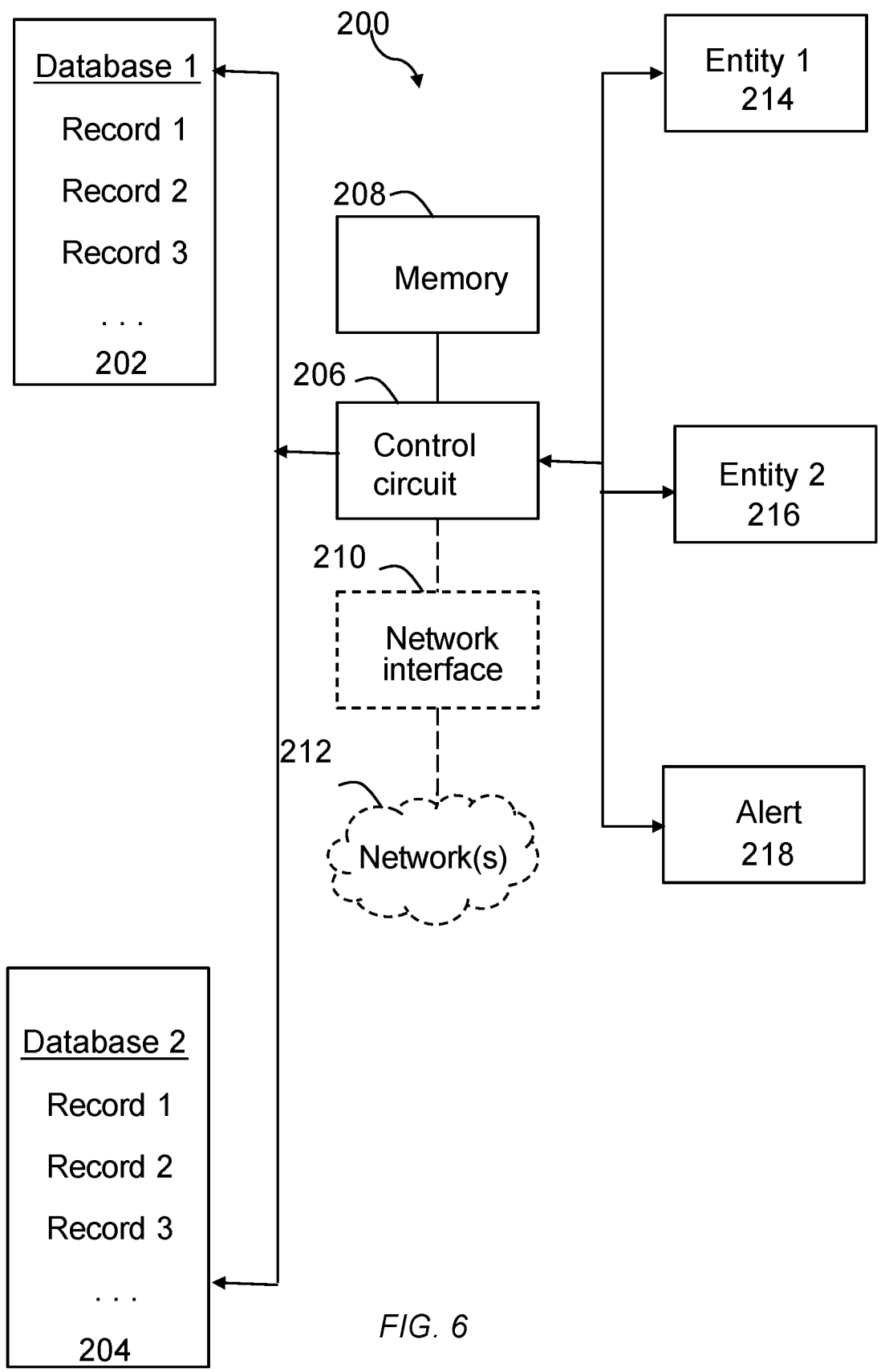
FIG. 6 is a block diagram in accordance with some embodiments.

Referring to FIG. 6, there is shown a system 200 for determining entities involved in multiple transaction. This system 200 incorporates and supplements the system 100 and components shown in FIGS. 1-5. In one form, it is contemplated that the system 200 is used in connection with financial transactions. It may be used to determine if a single entity is involved in transactions totaling over a certain dollar amount (such as $10,000) within a predetermined amount of time (such as a day).

The system 200 includes at least one database 202 and 204 containing a plurality of records corresponding to a plurality of transactions. Further, each record includes a plurality of fields relating to a nominal entity involved in the corresponding transaction. For example, the database(s) may contain financial transaction data that may relate to or involve money transfers, bill payments, money orders, check cashing, gift card transactions, cash withdrawals, etc. Each record may include a variety of fields/entries, such as, for example, first name, middle name, last name, address, birth date, and/or identification numbers.

The system 200 also includes a control circuit 206 that is configured to perform certain operations. In this context, the term control circuit 206 refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 206 may be configured (for example, by using corresponding programming stored in a memory as will be well understood by those skilled in the art) to carry out one or more of the steps, actions, and/or functions described herein.

As shown in FIG. 6, the control circuit 206 is coupled to a memory 208 and to a network interface 210 and wireless network(s) 212. The memory 208 can, for example, store non-transitorily computer instructions that cause the control circuit 206 to operate as described herein, when the instructions are executed, as is well known in the art. Further, the network interface 210 may enable the control circuit 206 to communicate with other elements (both internal and external to the system 200). This network interface 210 is well understood in the art. The network interface 210 can communicatively couple the control circuit 206 to the wireless network 212 and whatever other networks 212 may be appropriate for the circumstances. The control circuit 206 may make use of cloud databases and/or operate in conjunction with a cloud computing platform. As can be seen, the control circuit 206 is coupled to one or more databases 202 and 204.

The control circuit 206 is configured to include, execute, and/or control modules and/or components described above in connection with system 100. More specifically, it is configured, to include, execute, and or control a data ingestion subsystem including a data cleaner that removes characters from record entries and a data standardizer that generates standardized record entries; a metaphone generator; record pair builder; comparison value (or vector) generator; and a classifier/probability generator. The operations and actions of the control circuit 206 are described further below.

The control circuit 206 is configured to receive records from one or more databases (such as databases 202 and 204). Further, it is configured to remove characters from a first set of entries in the records received from the at least one database and generate standardized records for a second set of entries in the records. In other words, it cleans certain record entries by removing extraneous characters and it standardizes certain record entries so as to facilitate the comparison of records.

In one form, the control circuit 206 is configured to remove characters from name entries in name fields, such as titles at the beginning of names and suffixes at the ends of names. For example, it may delete the characters Mr., Ms., Jr. Sr., etc. In addition, in one form, it generates standardized address entries in address fields. In one form, the control circuit 206 may generate standardized addresses via a third-party API, such as, for example, the Smarty Street Address Validation API.

The control circuit 206 is configured to create a metaphone of at least one entry in each record, the metaphone approximating how the at least one entry sounds. The creation of a metaphone reduces the errors and discrepancies resulting from different English spellings and pronunciations of words. In one form, the control circuit 206 is configured to create a metaphone of a first name and a metaphone of a last name of each nominal entity involved in each corresponding transaction, the metaphones approximating how the first and last names sound. FIG. 2 shows examples where differently spelled names have the same metaphones.

The control circuit 206 is configured to create a plurality of record pairs in which the two records in each record pair are to be compared against one another. The total number of record pairs is determined by predetermined blocking criteria to limit a total number of comparisons required by limiting the comparisons to predetermined fields. The blocking criteria allow comparison between records of only certain desired fields/record entries, rather than comparisons between all pairs of records. For example, blocking criteria may require that the metaphones of the first and/or last names be equal, records having the same metaphone of the first and/or last name are disposed in the same block, and comparisons are only made of record pairs within each block.

The control circuit 206 is also configured to compare the two records of each record pair against one another to produce a comparison value indicating a degree of similarity between the two records. The similarities of the string sequences of the two records are compared. Several algorithms are available for making this sort of comparison, such as, for example, the Jaro-Winkler distance method and the Levenshtein distance method. In one form, it has been found desirable to use the Jaro-Winkler distance method.

The control circuit 206 then generates a probability that the two records of each record pair involve the same entity. Based on the comparison vector, a probability is determined that the two records of each record pair involve the same entity. It is assumed that the attributes are independent of each other. In one form, the comparison vectors may be processed using an ECM binary classifier to generate a probability of each record pair being a match.

In one form, the control circuit 206 iteratively generate and compare record pairs, each iteration involving application of different predetermined blocking criteria corresponding to one or more fields to determine the record pairs. In other words, the control circuit 206 applies different blocking criteria for each iteration. Also, in each iteration, the control circuit 206 determines that each record pair is either a match or a non-match based on comparison of each probability to a predetermined threshold probability. It transitively links matched record pairs with other corresponding matched record pairs to determine a group of record pairs involving the same entity. Direct and indirect linking of matched entities may be achieved through various algorithms, such as, for example, NetworkX, and each group may be assigned a unique identifier.

In one form, the control circuit 206 assigns a unique identifier for each different entity. The same unique identifier is assigned to each record in matched record pairs that are transitively linked to one another. For example, in FIG. 5, global ID 1 has been assigned to each of the three records where it has been determined that they involve the same entity Louis Gary Wilson. In FIG. 6, unique identifiers are assigned to Entity 1 (214), Entity 2 (216), etc.

In one application, it is contemplated that the control circuit 206 is used in a financial context to identify all financial transactions involving the same entity over a predetermine period of time. The control circuit 206 may identify all transactions corresponding to the same entity based on each unique identifier, the transactions being financial transactions. It may total the amount of the transactions corresponding to the same entity and generate an alert 218 when the total amount exceeds a predetermined threshold over a predetermined time period. So, for example, it may generate an alert when total amount of financial transactions exceeds $10,000 in a one-day period.

As stated above, it is generally contemplated that the control circuit 206 will iteratively run multiple modules so as to improve the matching accuracy while balancing the improved accuracy against the time required to run the modules. The modules may be run in a certain order so as to balance these concerns. Many of the modules apply different blocking criteria, resulting in different comparisons.

Referring to FIGS. 7-15, there is shown an example of an iterative approach involving multiple modules. In this example, eight modules with pre-defined set of algorithms makes one complete run of entity resolution for given data. Generally, the records are processed through each of the modules until assigned a unique identifier (alliance ID). If they match, they are assigned the existing alliance ID, and if not matched they will be processed through following modules. Once all modules are complete, each entity will have its unique identifier. Linked entities share the same unique identifier and non-linked entities have unique identifiers. New incoming records may be compared against the existing records in the database and follow the general entity resolution steps.

Figure 7:
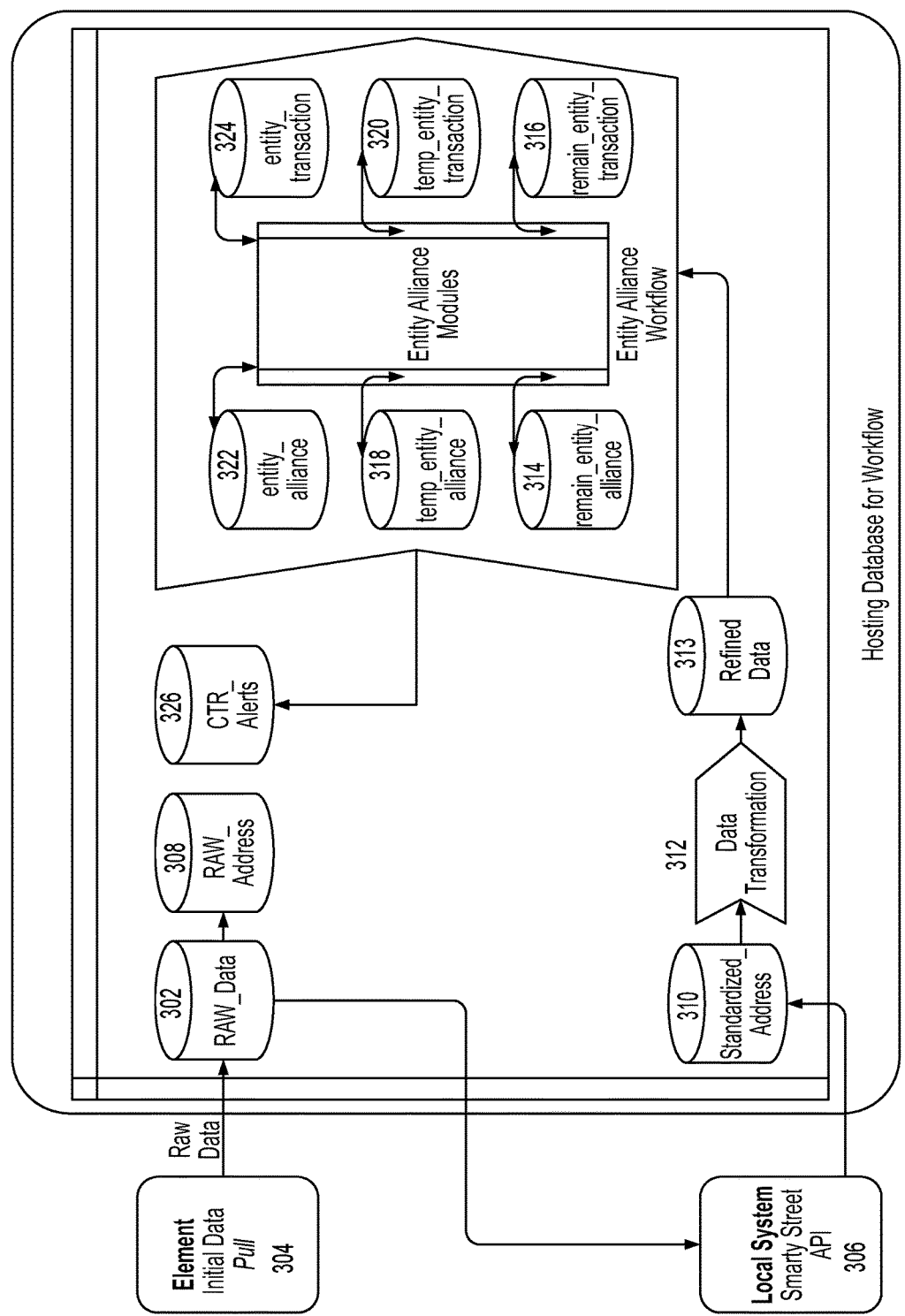
FIG. 7 is a flow diagram in accordance with some embodiments.

FIG. 7 shows a data ingestion subsystem 300 in which raw data 302 is pulled from two databases 304. A third-party API 306 is used to convert raw addresses 308 to a standardized address format 310. Data undergoes a cleaning/data transformation 312 to make it usable for comparison purposes (refined data 313). Then, the workflow involves six databases: remain entity alliance/transaction databases 314 and 316 (data remaining after execution of each module), temp entity alliance/transaction databases 318 and 320 (temporary databases after matching performed), and entity alliance/transaction databases 322 and 324 (final databases with unique identifier linking same entities). Generally, the PII data are stored in the entity table/database 322, and transactional data are stored in transaction table/database 324, when the entity is assigned a unique identifier (or alliance ID). In one form, where the data is financial data, after the data proceeds iteratively through the module, a CTR alert 326 may be generated if the financial transactions total above a certain amount during a certain time period.

Figure 8:
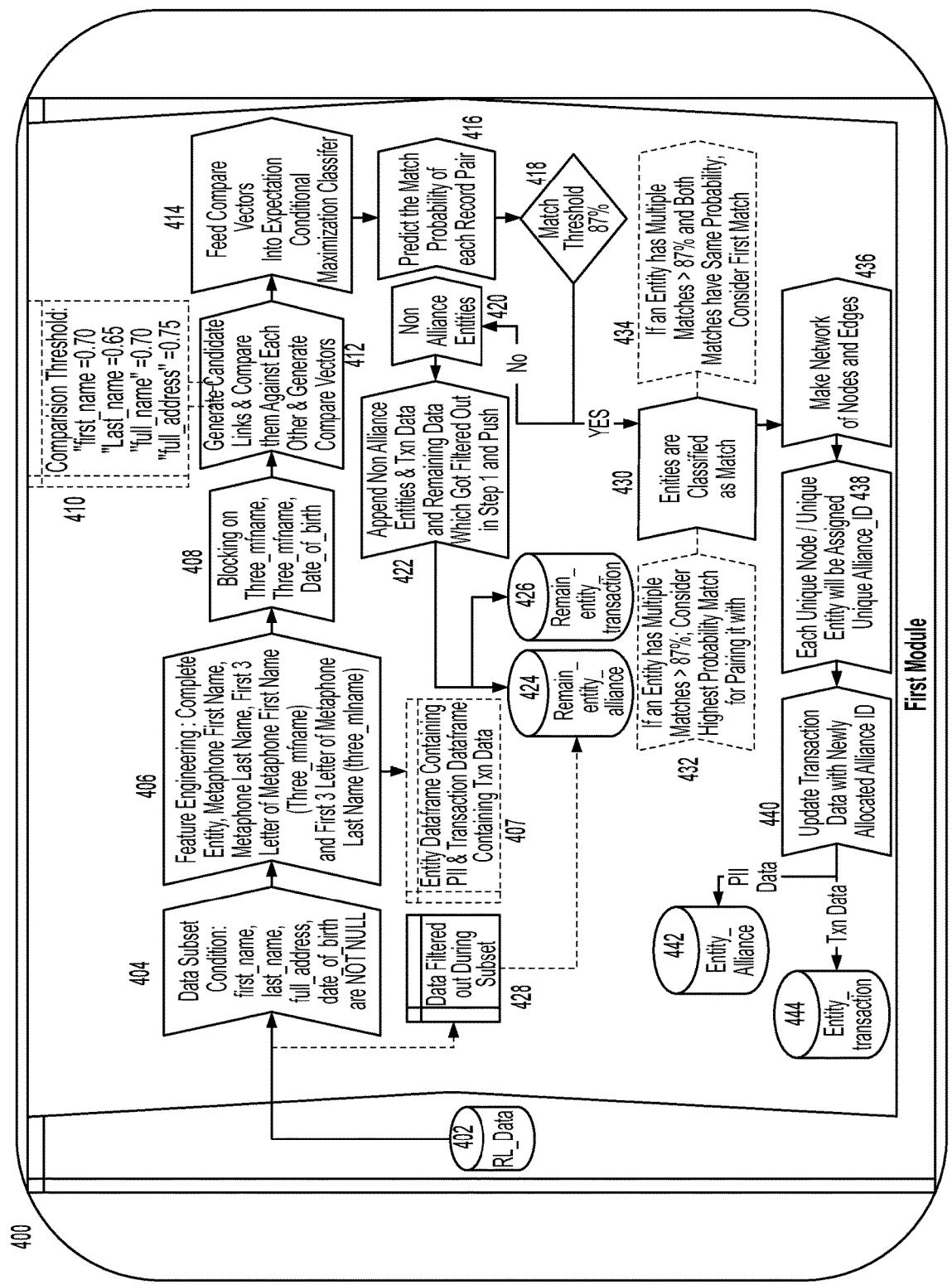
FIG. 8 is a flow diagram in accordance with some embodiments.

Referring to FIG. 8, the workflow proceeds to the first module 400. Module 400 starts with the RL database 402 that holds all of the data. At block 404, the data subset condition is applied in which the first name, last name, full address, and date of birth record entries are not empty or null. At blocks 406 and 407, a metaphone generator creates metaphones for the first and last names in the records (which will be used for several modules). At block 408, blocking is performed to limit the number of records, and the blocking considers records based on the first three letters of the metaphones of the first and last names and based on the date of birth. At blocks 410, 412, 414, and 416, comparison links for record pairs are generated and probabilities are determined based on an ECM binary classifier. At block 418, a match threshold has been selected (and in this instance is 87%) and is applied to categorize the record pairs as matching or not matching.

In a preferred form, it is contemplated that the metaphones that are created are the first three letters of a full metaphone of the first name and the first three letters of a full metaphone of the last name. These three-letter metaphones are also used in subsequent modules, as described below. However, it should be understood that, in other forms, other types of metaphones may be used, such as, for example, the first two letters of metaphones of the first and last names, the first four letters of metaphones of the first and last names, or some other abbreviated version of the full metaphones. In other words, it is generally contemplated that some or all of a complete metaphone of the first and/or last names may be used. Further, in other forms, it is also contemplated that, as an alternative or in addition, abbreviated or full metaphones may be created and used with respect to other fields/entries, not just the first and/or last names.

If not a match, the workflow proceeds to blocks 420 and 422. The data are stored in the remain entity alliance and remain entity transaction databases 424 and 426 (unmatched data remaining after execution of each module). Further, at block 428, data that was initially filtered out during the blocking stage is also stored in these databases 424 and 426. Records in these databases 424 and 426 will generally undergo further comparisons in subsequent modules.

If there is a match, the workflow proceeds to blocks 430, 432, 434, 436, 438, and 440. The compared entities are classified as a match, and they are each assigned a unique identifier (unique alliance ID). Then, the PII data are stored in the entity alliance database 442, and the transaction data are stored in the entity transaction database 444. Records in these databases 442 and 444 will generally not undergo further comparisons in subsequent modules.

Figure 9:
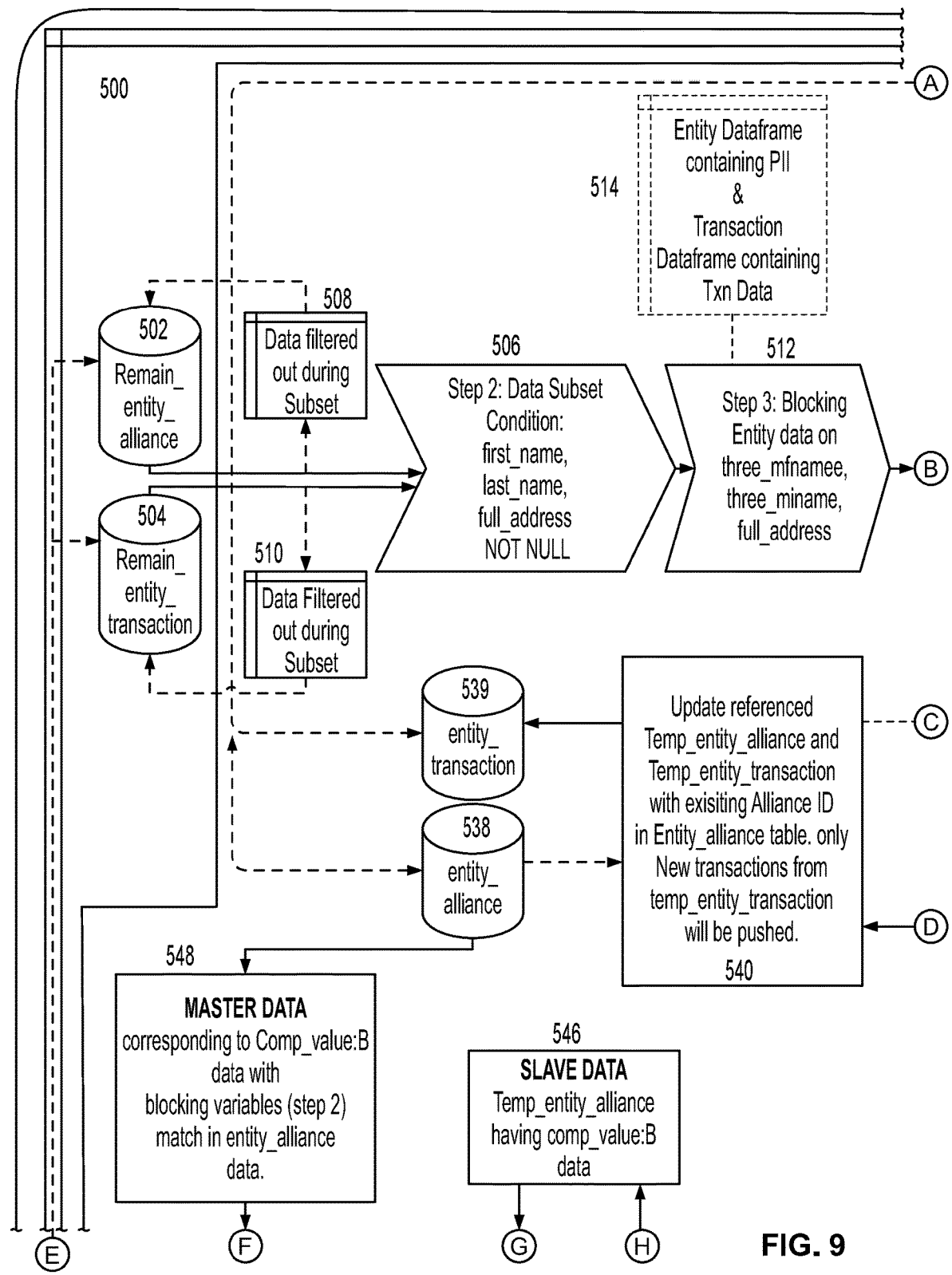
FIG. 9 is a flow diagram in accordance with some embodiments.
Figure 9:
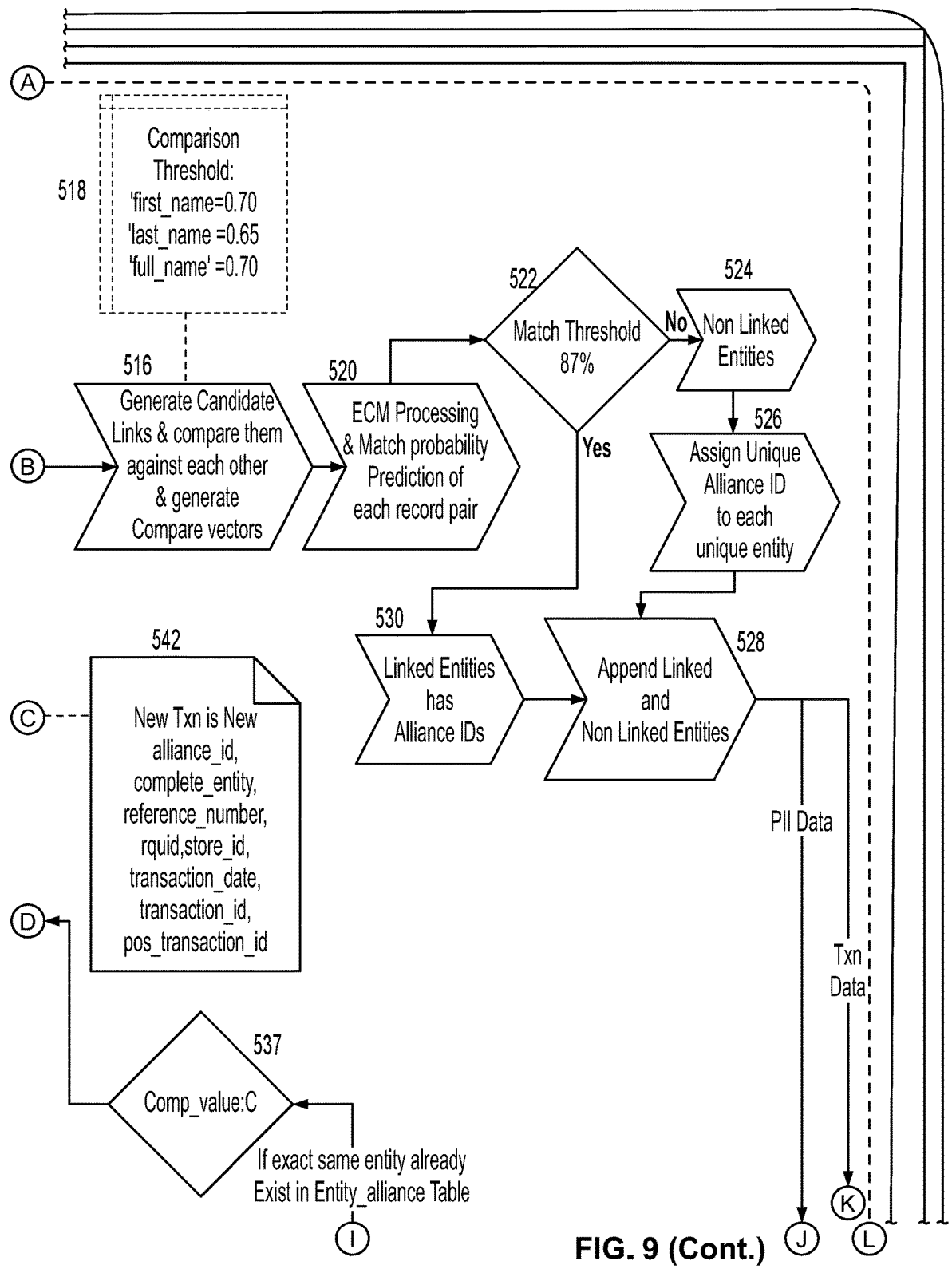
Figure 9:
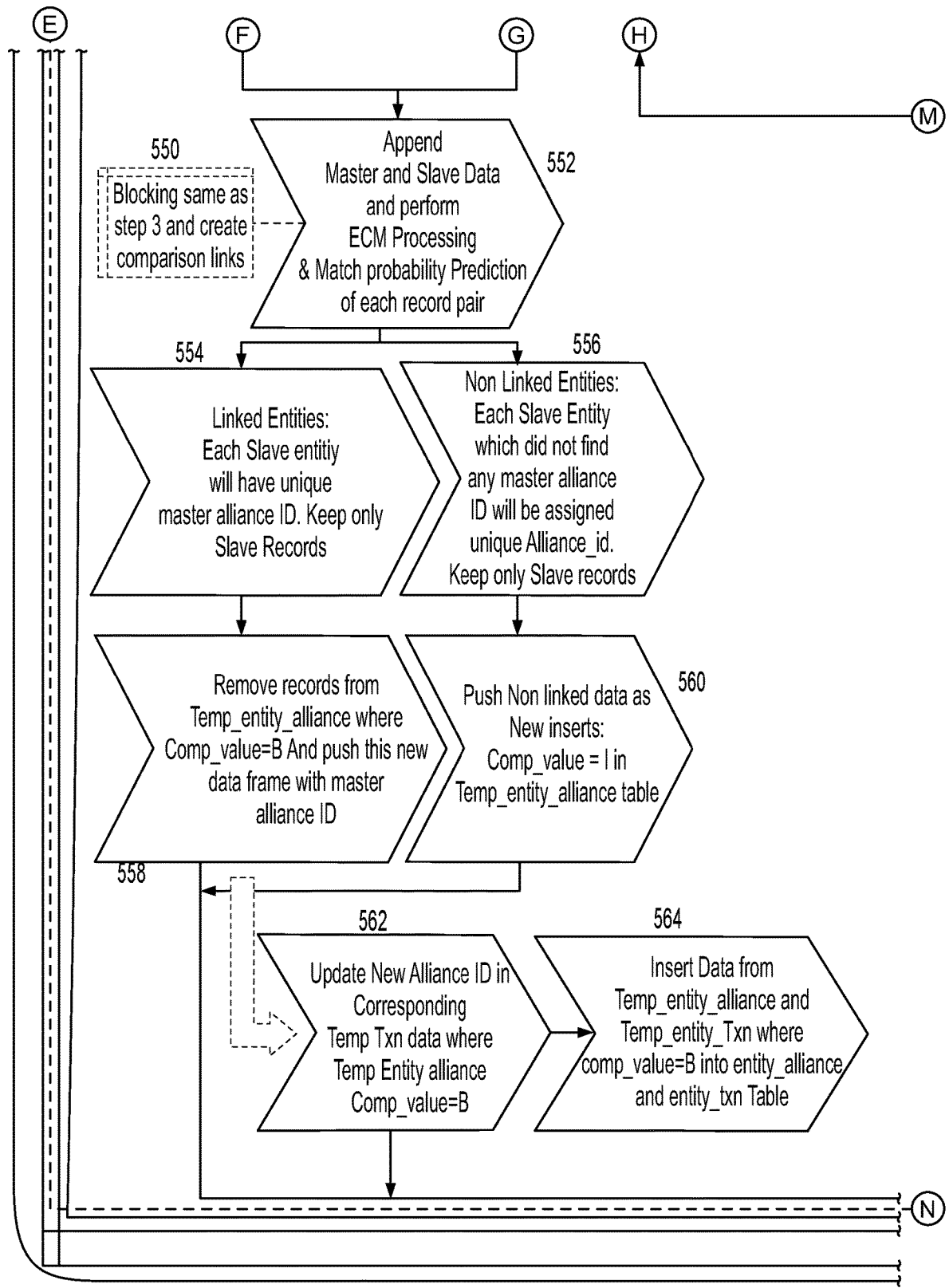
Figure 9:
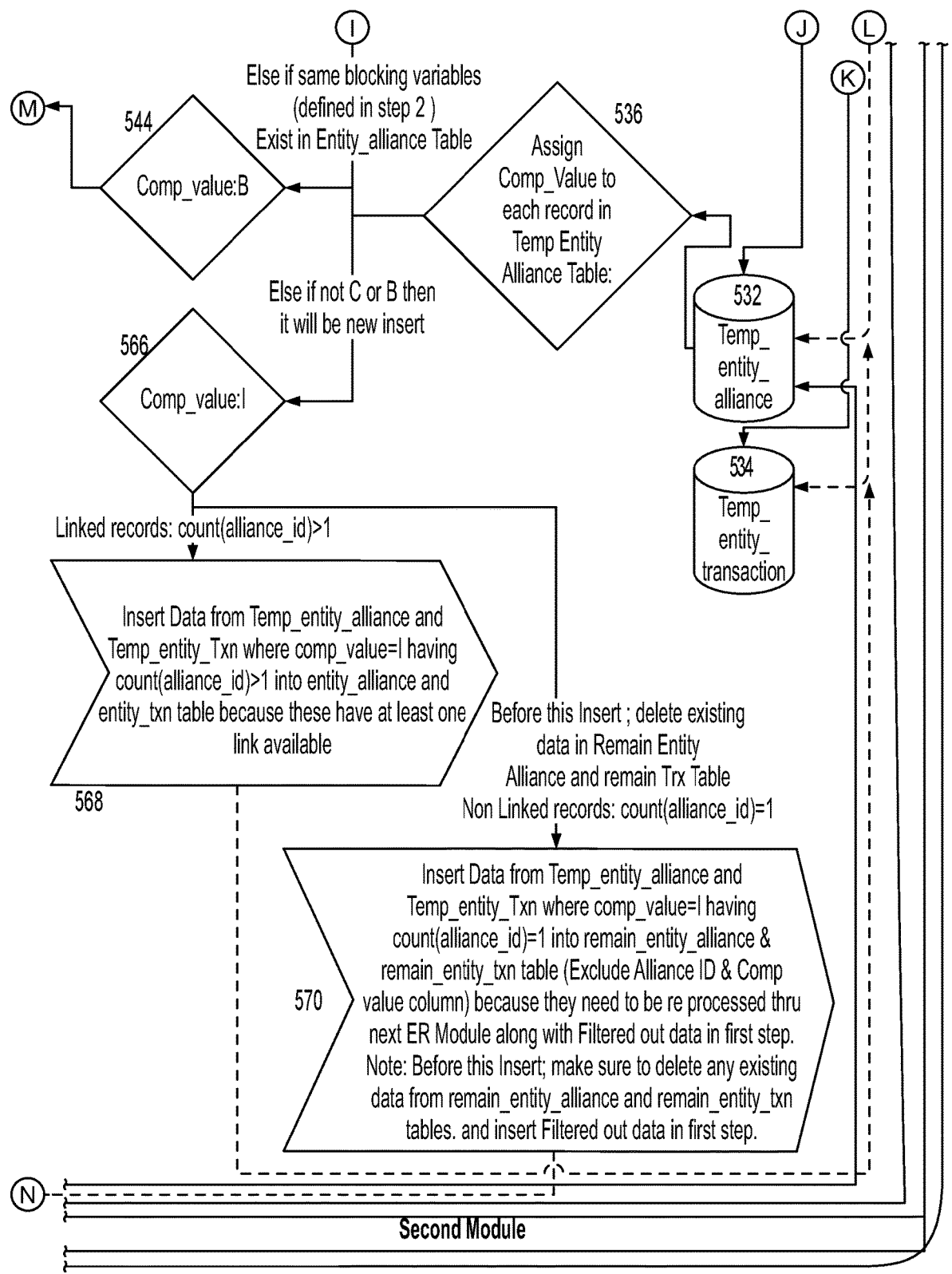

Referring to FIG. 9, the workflow proceeds to the second module 500. Module 500 starts with the remain entity alliance database 502 and remain entity transaction 504 that hold the remaining data records to be compared. At block 506, the data subset condition is applied in which the first name, last name, and full address record entries are not empty or null. At blocks 508 and 510, data that does not meet the subset condition has been filtered out and remains in the databases 502 and 504 for future modules. At blocks 512 and 514, blocking is performed to limit the number of records, and the blocking considers records based on the first three letters of the metaphones of the first and last names and based on the full address. At blocks 516, 518, and 520, comparison links for record pairs are generated and probabilities are determined based on an ECM binary classifier. At block 522, a match threshold has been selected (and in this instance is 87%) and is applied to categorize the record pairs as matching or not matching. At blocks 524, 526, 528, and 530, matched and unmatched entities are assigned unique identifiers (unique alliance IDs). After matching has been performed, the data are stored in temp entity alliance/transaction databases 532 and 534 (temporary databases after matching performed).

At block 536, the workflow proceeds along one of three flow paths. First, at block 537 it is determined if the exact same entity already exists in the entity alliance database 538. If so, then the workflow proceeds via blocks 540 and 542.

Second, if the same blocking variables exist in the entity alliance database 538, the workflow proceeds via block 544, 546, and 548. At blocks 550 and 552, comparison links for record pairs are generated and probabilities are determined based on an ECM binary classifier. At blocks 554, 556, 558, 560, 562, and 564, linked entities and unlinked entities are assigned unique identifiers, and the temp entity alliance/transaction databases 532 and 534 and the entity alliance/transaction databases 538 and 539 are updated.

Third, if the same entity does not already exist in the entity alliance database 538 and the same blocking variables do not exist in the entity alliance database 540, then the workflow proceeds to block 566. At block 568, for linked records (where the count is greater than one), the data are inserted from the temp entity alliance/transaction databases 532 and 534 into the entity alliance/transaction databases 538 and 539 because there is, at least, one link available. In contrast, at block 570, for non-linked records (where the count equals one), the data are inserted from the temp entity alliance/transaction databases 532 and 534 into the remain entity alliance/transaction databases 502 and 504. The data inserted into these remain entity alliance/transaction databases 502 and 504 will be reprocessed in the subsequent module (along with data that was filtered out at blocks 512 and 514).

Figure 10:
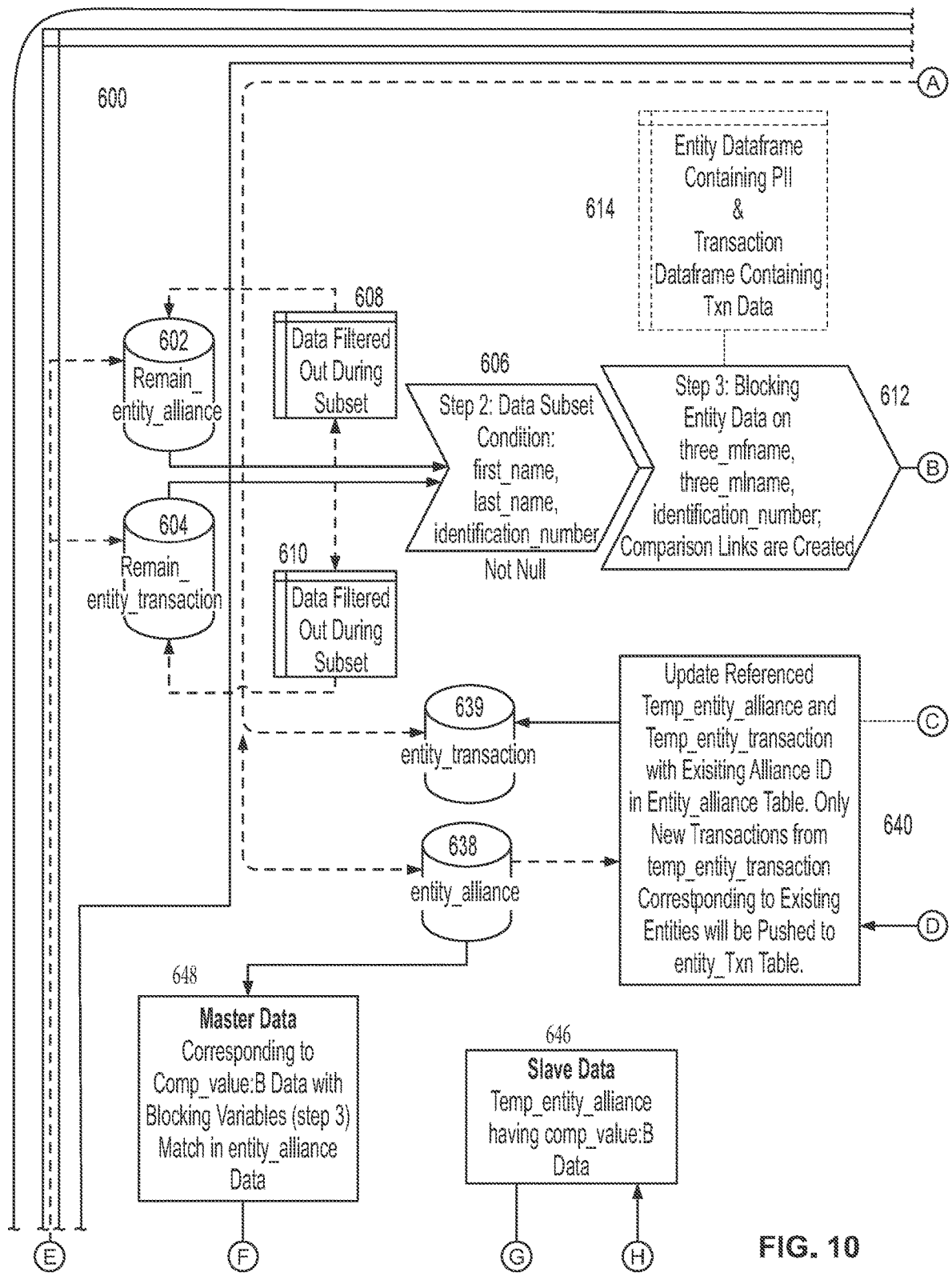
FIG. 10 is a flow diagram in accordance with some embodiments.
Figure 10:
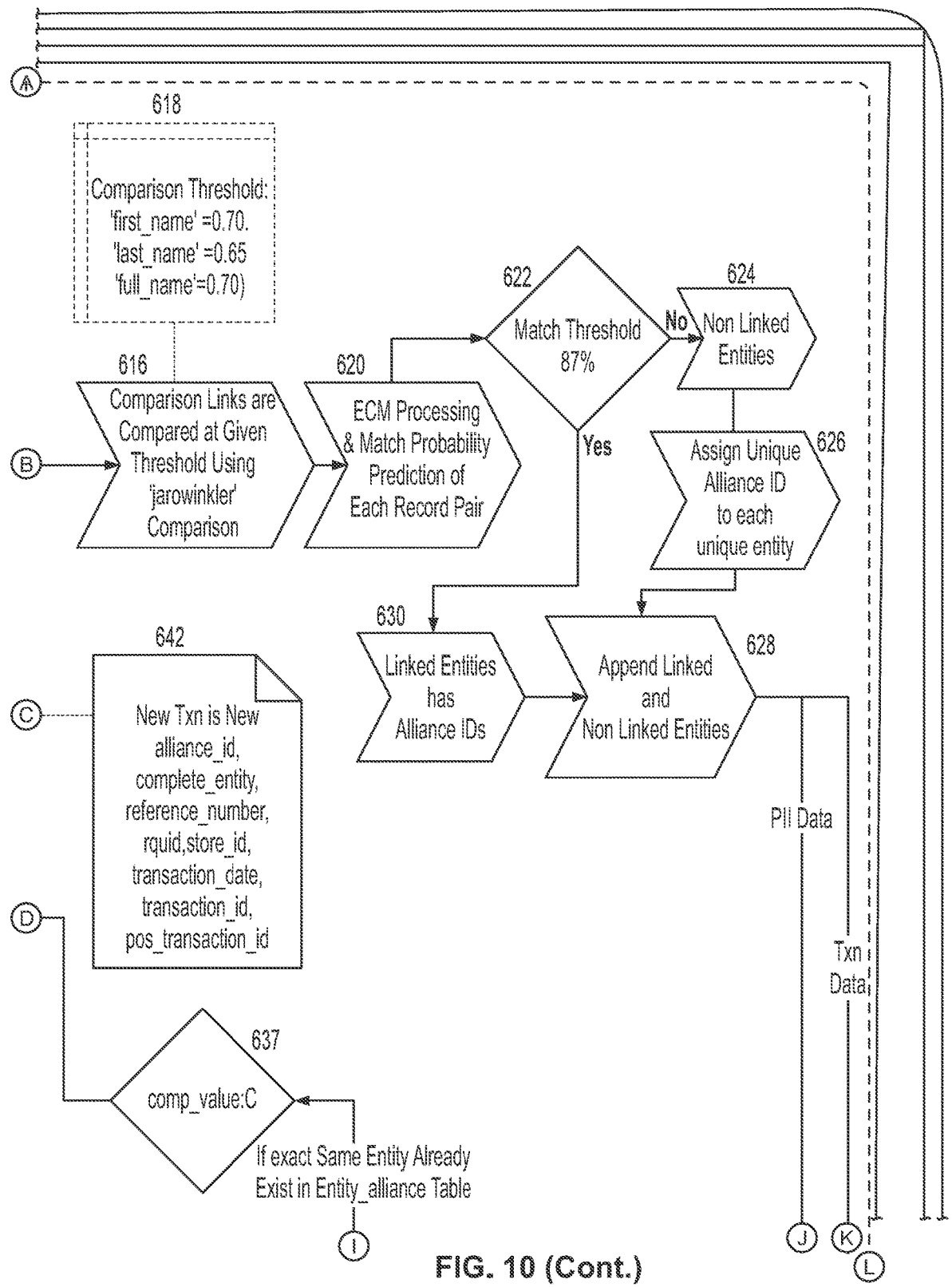
Figure 10:
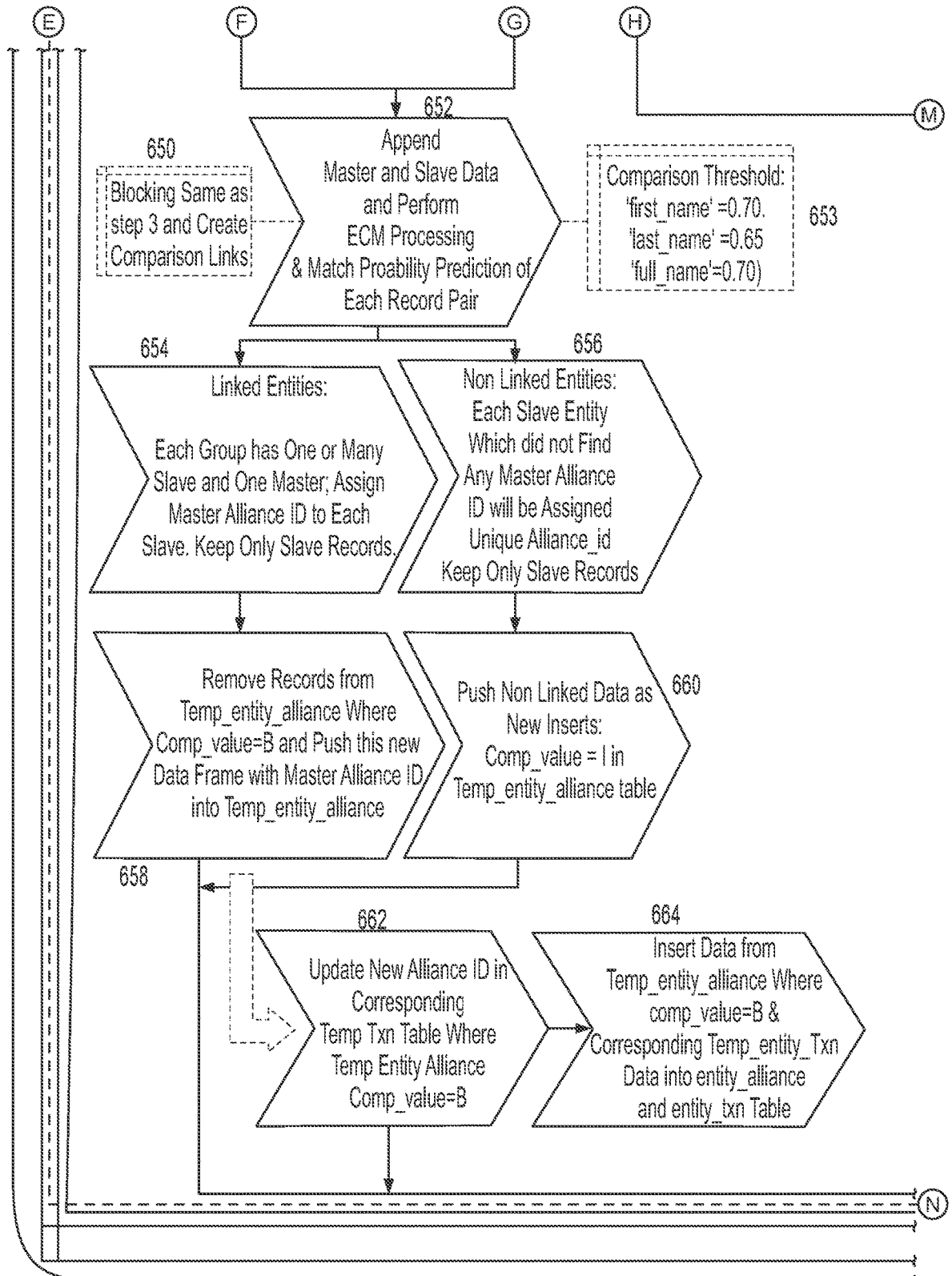
Figure 10:
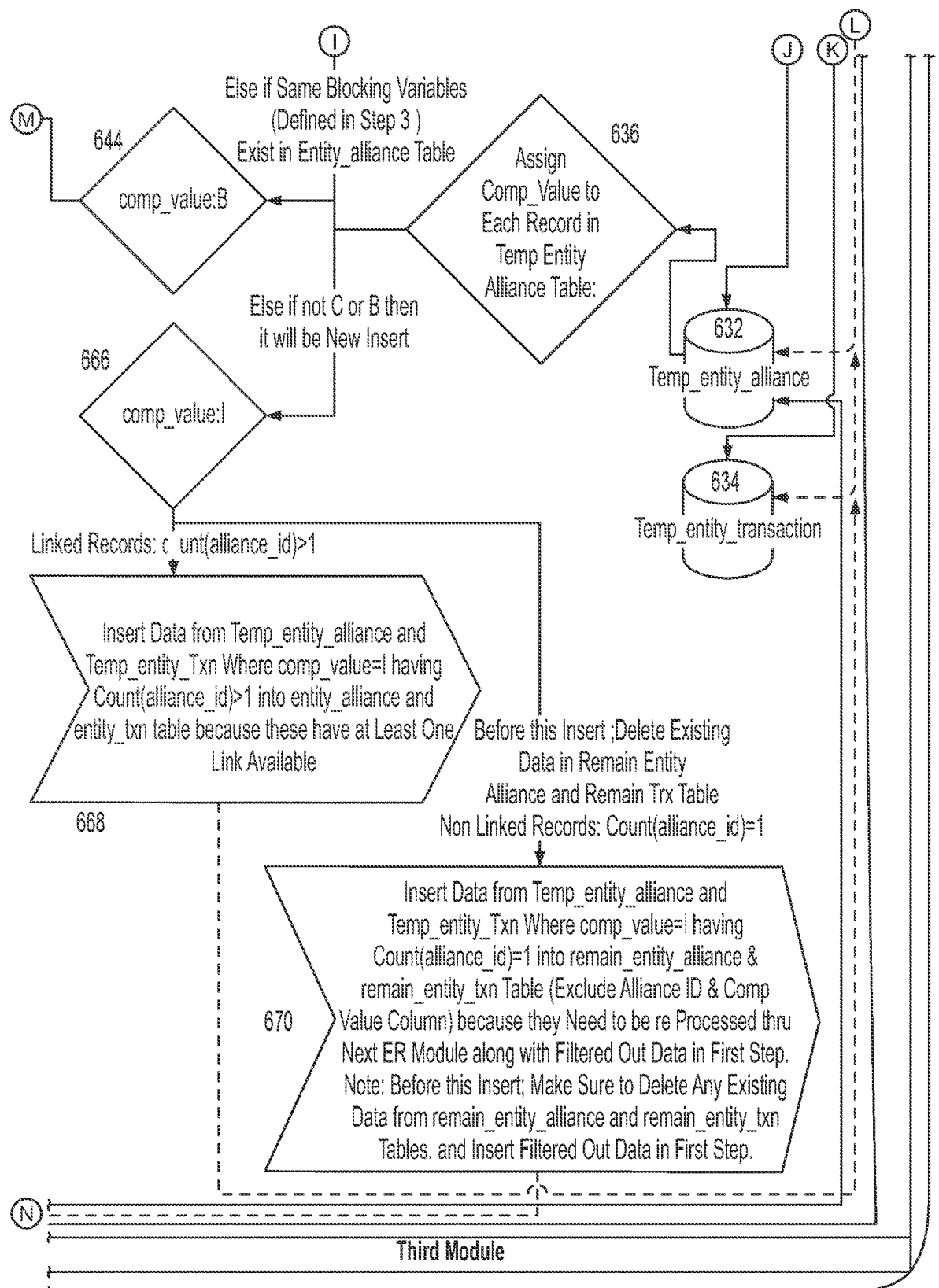

Referring to FIG. 10, the workflow proceeds to the third module 600 (which is similar to module 500 but with different subset conditions and blocking variables). Module 600 starts with the remain entity alliance database 602 and remain entity transaction 604 that hold the remaining data records to be compared. At block 606, the data subset condition is applied in which the first name, last name, and identification number record entries are not empty or null. At blocks 608 and 610, data that does not meet the subset condition has been filtered out and remains in the databases 602 and 604 for future modules. At blocks 612 and 614, blocking is performed to limit the number of records, and the blocking considers records based on the first three letters of the metaphones of the first and last names and based on the identification number. At blocks 616, 618, and 620, comparison links for record pairs are generated and probabilities are determined based on an ECM binary classifier. At block 622, a match threshold has been selected (and in this instance is 87%) and is applied to categorize the record pairs as matching or not matching. At blocks 624, 626, 628, and 630, matched and unmatched entities are assigned unique identifiers (unique alliance IDs). After matching has been performed, the data are stored in temp entity alliance/transaction databases 632 and 634 (temporary databases after matching performed).

At block 636, the workflow proceeds along one of three flow paths. First, at block 637, it is determined if the exact same entity already exists in the entity alliance database 638. If so, then the workflow proceeds via blocks 640 and 642.

Second, if the same blocking variables exist in the entity alliance database 638, the workflow proceeds via block 644, 646, and 648. At blocks 650, 652, and 653, comparison links for record pairs are generated and probabilities are determined based on an ECM binary classifier. At blocks 654, 656, 658, 660, 662, and 664, linked entities and unlinked entities are assigned unique identifiers, and the temp entity alliance/transaction databases 632 and 634 and the entity alliance/transaction databases 638 and 639 are updated.

Third, if the same entity does not already exist in the entity alliance database 638 and the same blocking variables do not exist in the entity alliance database 640, then the workflow proceeds to block 666. At block 668, for linked records (where the count is greater than one), the data are inserted from the temp entity alliance/transaction databases 632 and 634 into the entity alliance/transaction databases 638 and 639 because there is, at least, one link available. In contrast, at block 670, for non-linked records (where the count equals one), the data are inserted from the temp entity alliance/transaction databases 632 and 634 into the remain entity alliance/transaction databases 602 and 604. The data inserted into these remain entity alliance/transaction databases 602 and 604 will be reprocessed in the subsequent module (along with data that was filtered out at blocks 612 and 614).

Figure 11:
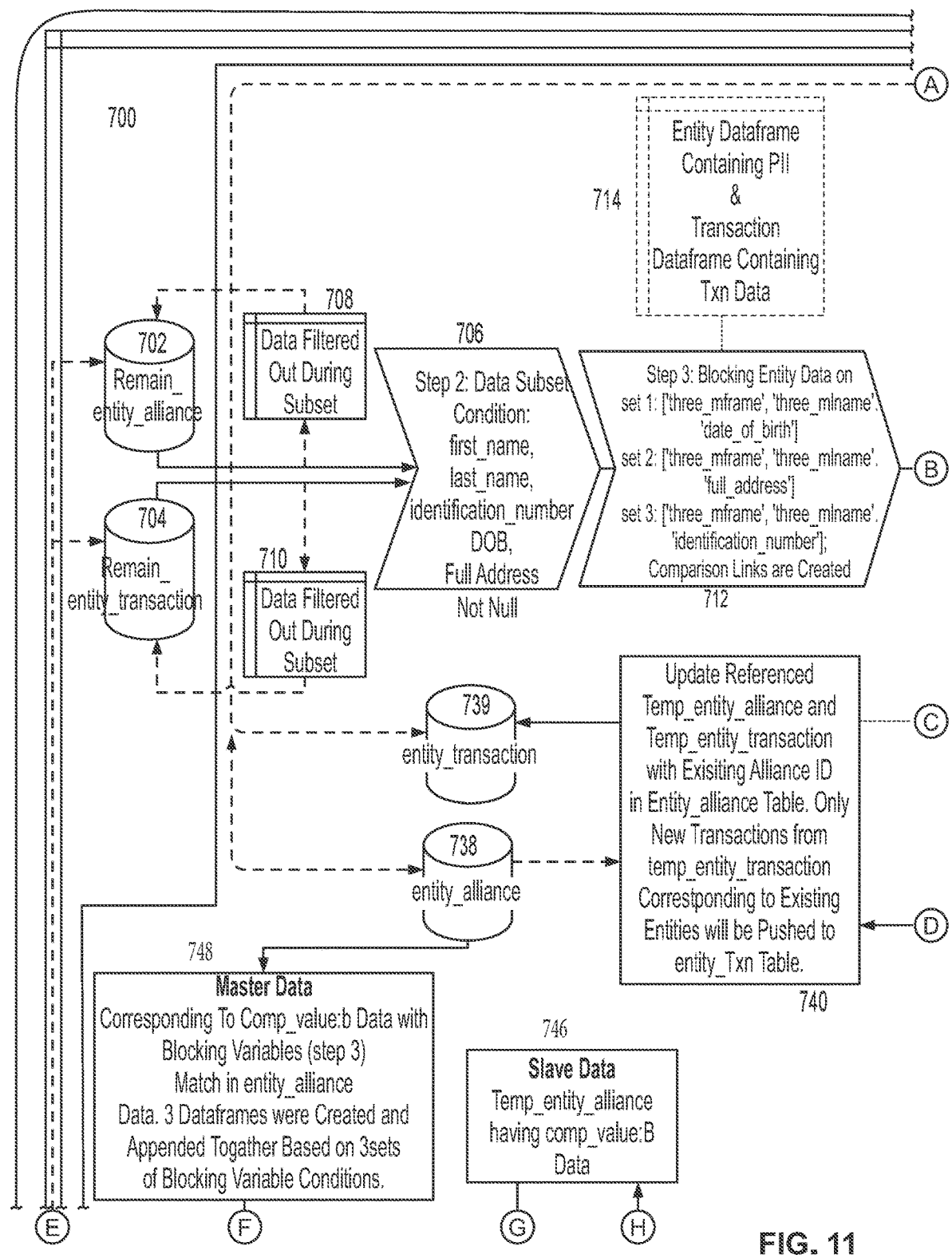
FIG. 11 is a flow diagram in accordance with some embodiments.
Figure 11:
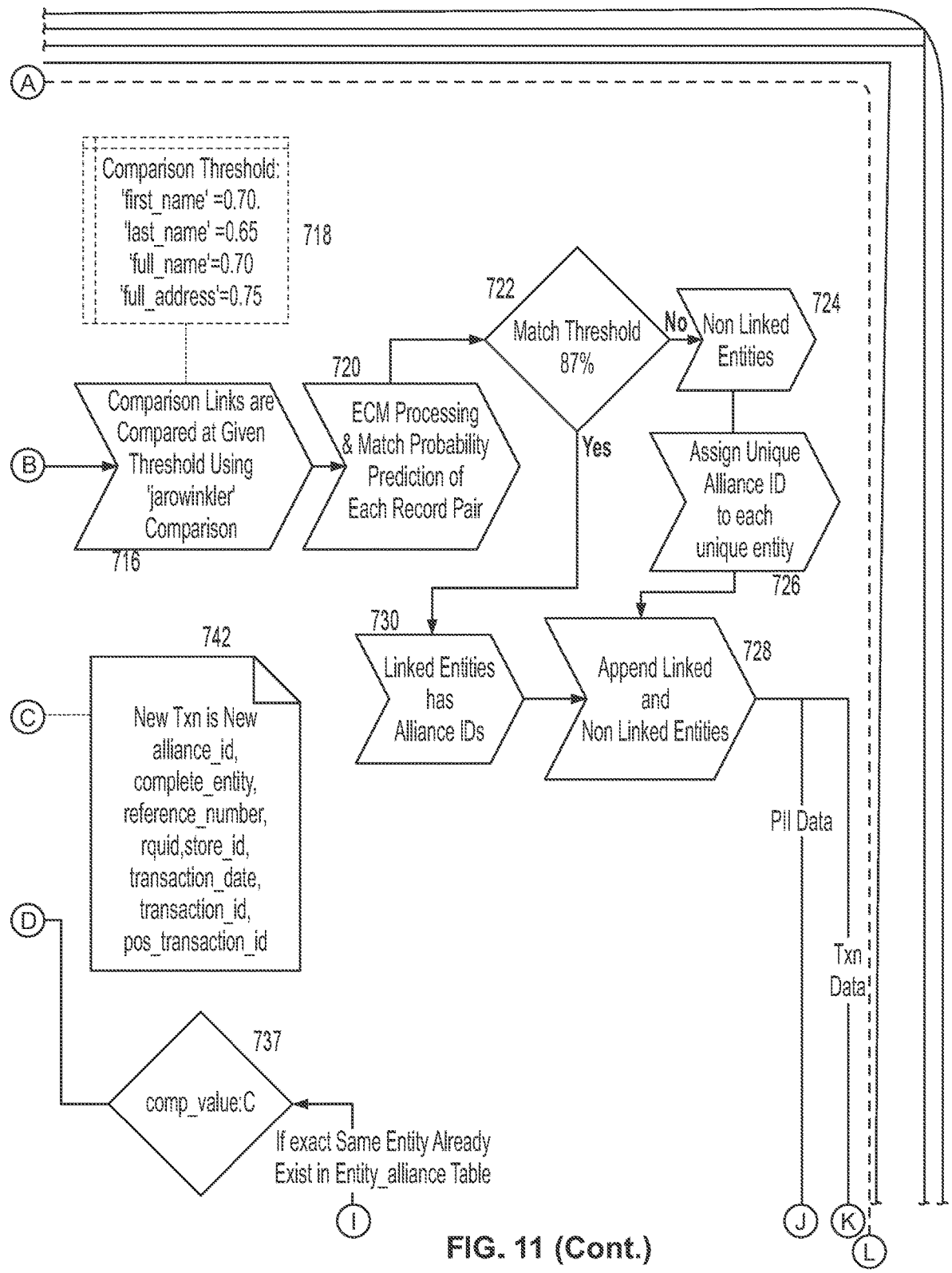
Figure 11:
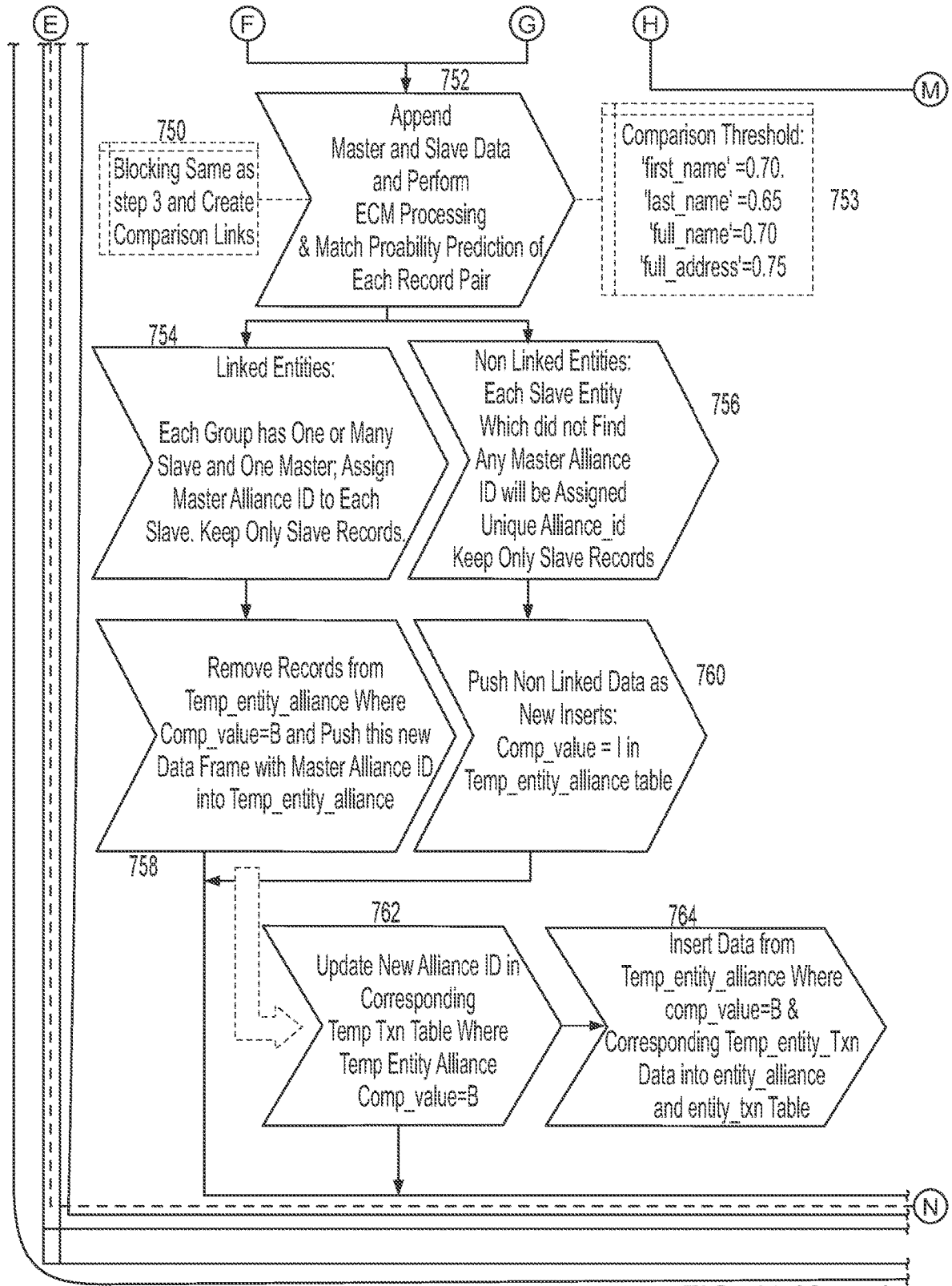
Figure 11:
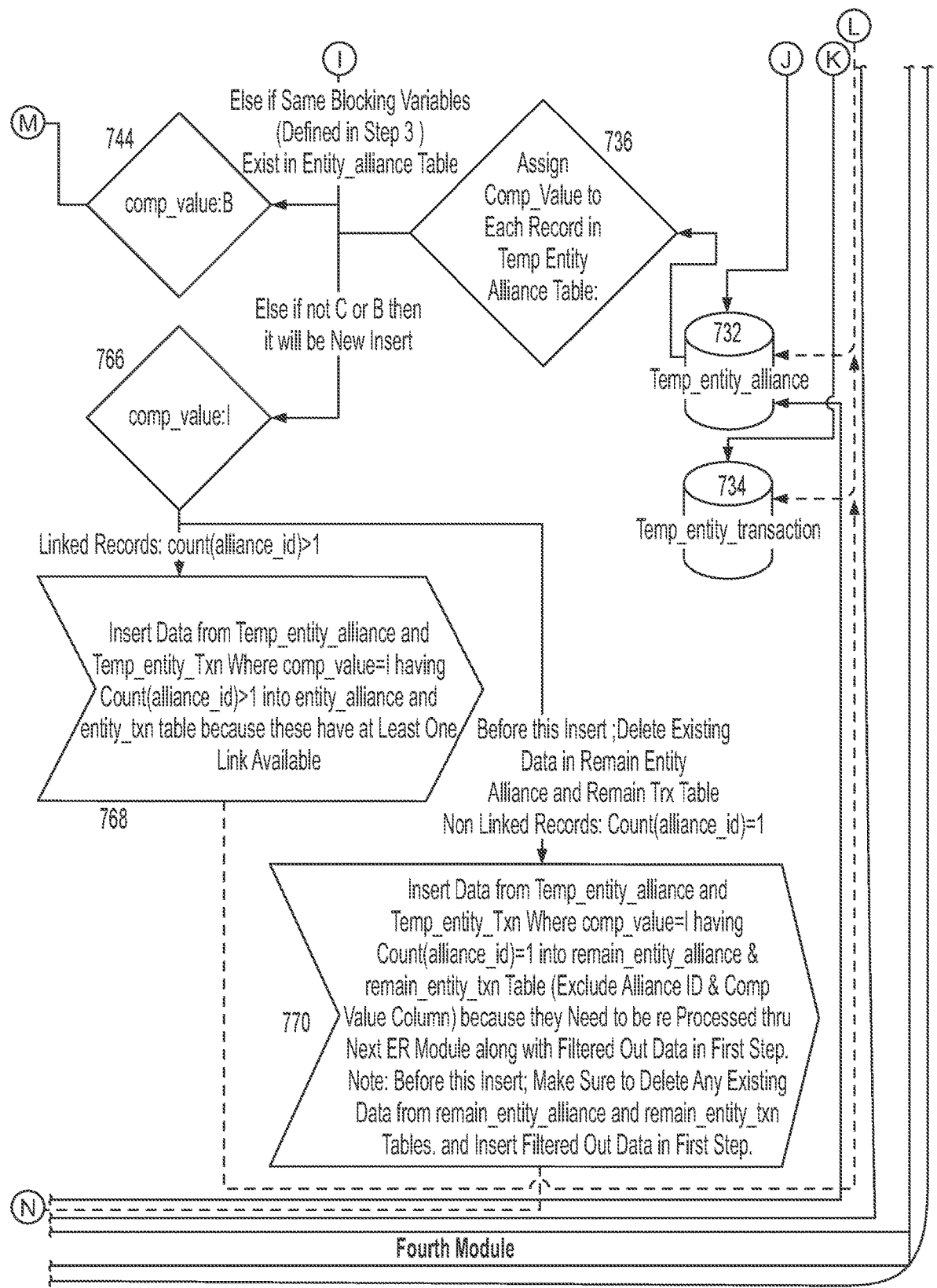

Referring to FIG. 11, the workflow proceeds to the fourth module 700 (which is similar to module 600 but with different subset conditions and blocking variables). Module 700 starts with the remain entity alliance database 702 and remain entity transaction 704 that hold the remaining data records to be compared. At block 706, the data subset condition is applied in which the first name, last name, identification number, date of birth, and full address record entries are not empty or null. At blocks 708 and 710, data that does not meet the subset condition has been filtered out and remains in the databases 702 and 704 for future modules. At blocks 712 and 714, blocking is performed to limit the number of records, and the blocking involves three sets: (1) the first three letters of the metaphones of the first and last names and date of birth; (2) the first three letters of the metaphones of the first and last names and full address; and (3) the first three letters of the metaphones of the first and last names and identification number. At blocks 716, 718, and 720, comparison links for record pairs are generated and probabilities are determined based on an ECM binary classifier. At block 722, a match threshold has been selected (and in this instance is 87%) and is applied to categorize the record pairs as matching or not matching. At blocks 724, 726, 728, and 730, matched and unmatched entities are assigned unique identifiers (unique alliance IDs). After matching has been performed, the data are stored in temp entity alliance/transaction databases 732 and 734 (temporary databases after matching performed).

At block 736, the workflow proceeds along one of three flow paths. First, at block 737, it is determined if the exact same entity already exists in the entity alliance database 738. If so, then the workflow proceeds via blocks 740 and 742.

Second, if the same blocking variables exist in the entity alliance database 738, the workflow proceeds via block 744, 746, and 748. At blocks 750, 752, and 753, comparison links for record pairs are generated and probabilities are determined based on an ECM binary classifier. At blocks 754, 756, 758, 760, 762, and 764, linked entities and unlinked entities are assigned unique identifiers, and the temp entity alliance/transaction databases 732 and 734 and the entity alliance/transaction databases 738 and 739 are updated.

Third, if the same entity does not already exist in the entity alliance database 738 and the same blocking variables do not exist in the entity alliance database 740, then the workflow proceeds to block 766. At block 768, for linked records (where the count is greater than one), the data are inserted from the temp entity alliance/transaction databases 732 and 734 into the entity alliance/transaction databases 738 and 739 because there is, at least, one link available. In contrast, at block 770, for non-linked records (where the count equals one), the data are inserted from the temp entity alliance/transaction databases 732 and 734 into the remain entity alliance/transaction databases 702 and 704. The data inserted into these remain entity alliance/transaction databases 702 and 704 will be reprocessed in the subsequent module (along with data that was filtered out at blocks 712 and 714).

Figure 12:
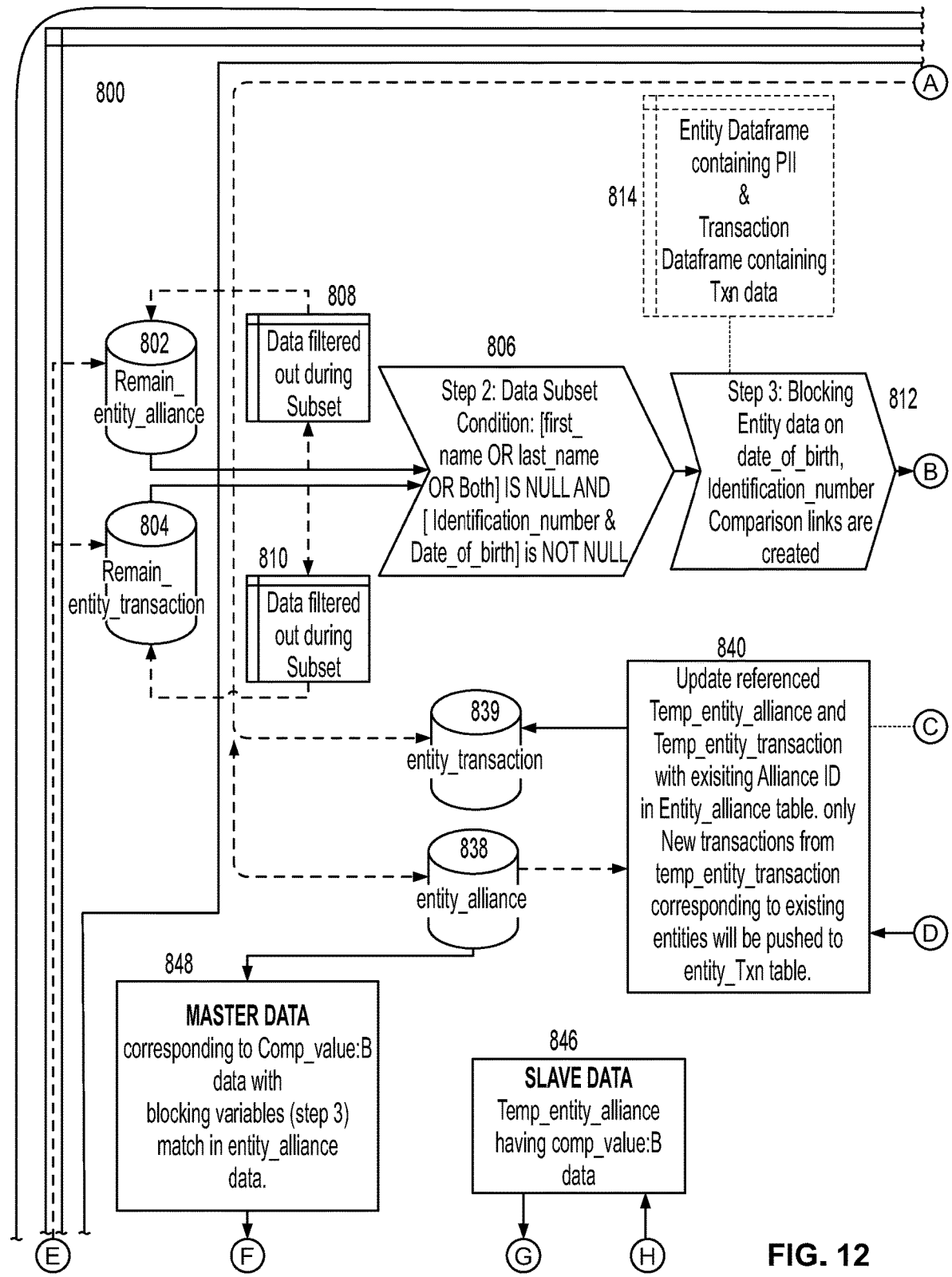
FIG. 12 is a flow diagram in accordance with some embodiments.
Figure 12:
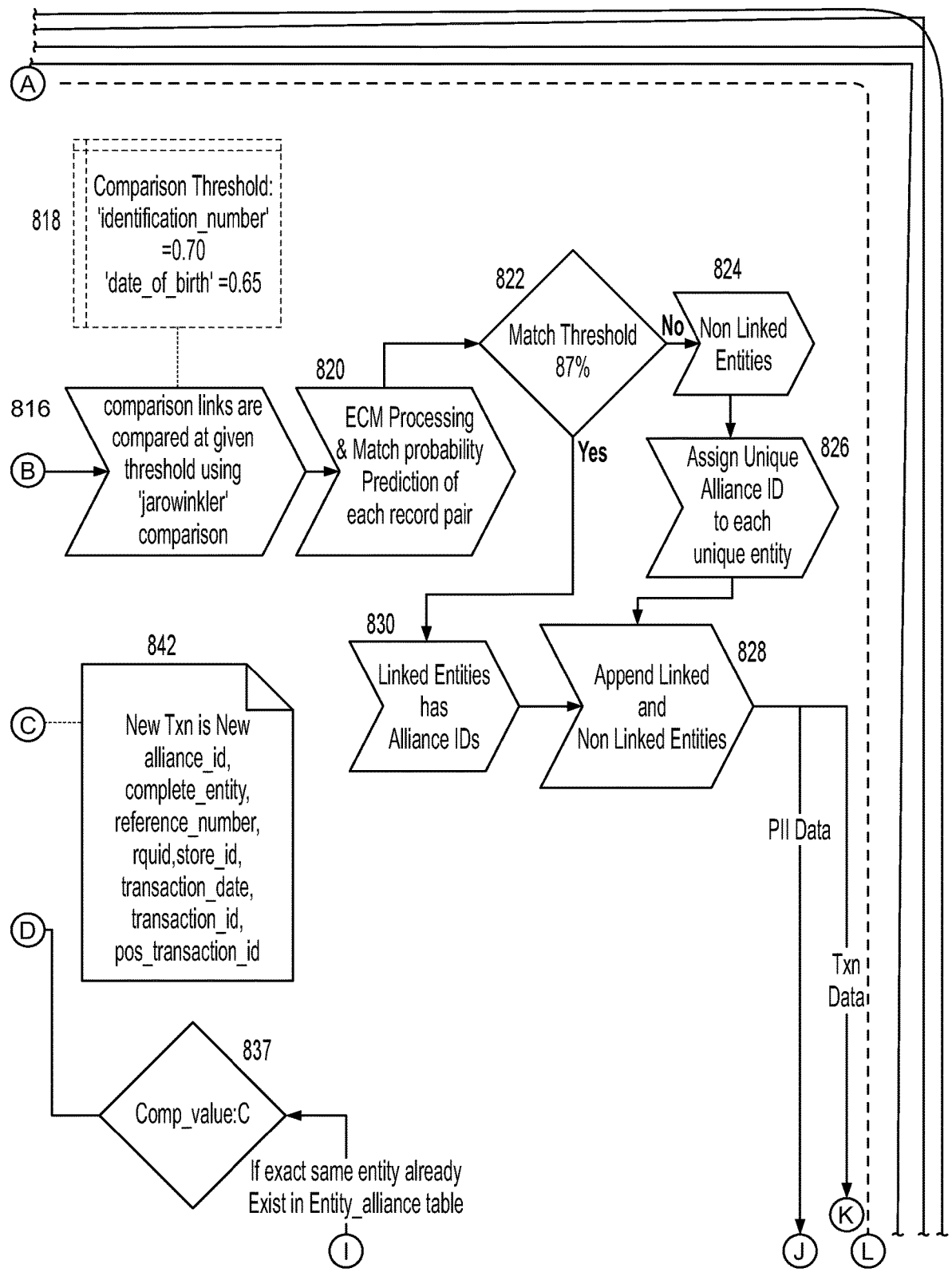
Figure 12:
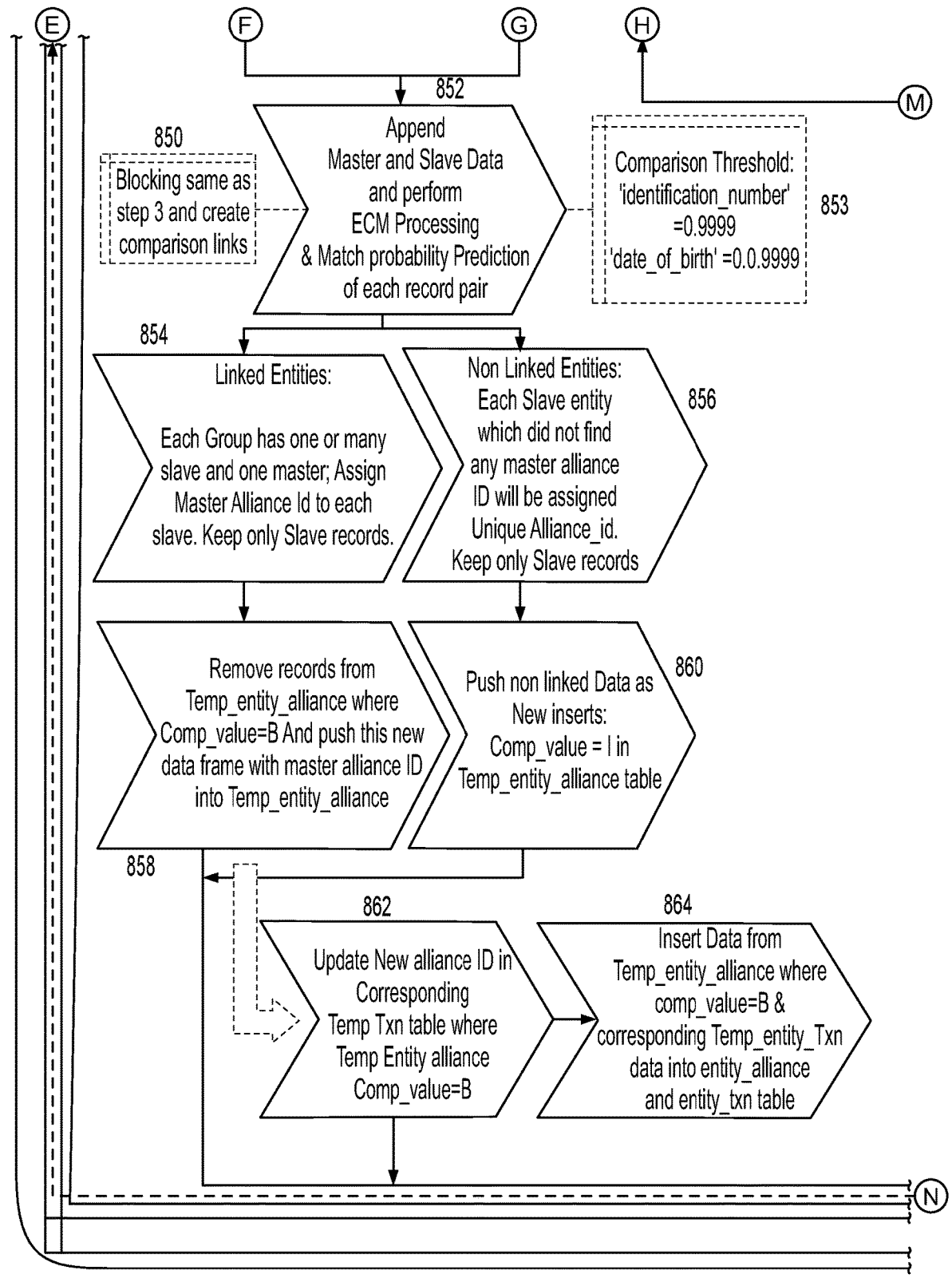
Figure 12:
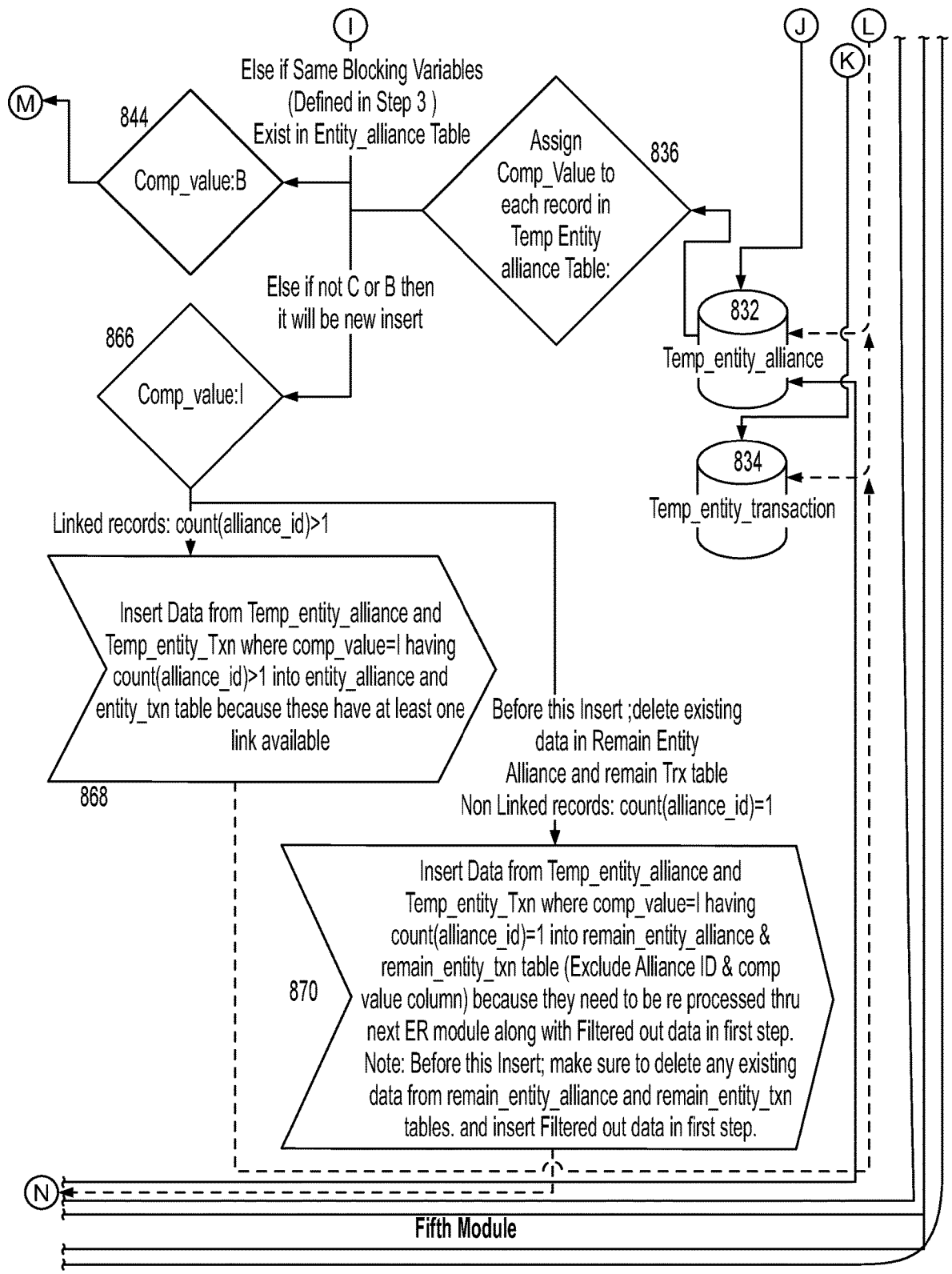

Referring to FIG. 12, the workflow proceeds to the fifth module 800 (which is similar to module 700 but with different subset conditions and blocking variables). Module 800 starts with the remain entity alliance database 802 and remain entity transaction 804 that hold the remaining data records to be compared. At block 806, the data subset condition is applied in which the first name or last name (or both) are null and the identification number and the date of birth are not null. At blocks 808 and 810, data that does not meet the subset condition has been filtered out and remains in the databases 802 and 804 for future modules. At blocks 812 and 814, blocking is performed to limit the number of records, and the blocking considers records based on date of birth and identification number. At blocks 816, 818, and 820, comparison links for record pairs are generated and probabilities are determined based on an ECM binary classifier. At block 822, a match threshold has been selected (and in this instance is 87%) and is applied to categorize the record pairs as matching or not matching. At blocks 824, 826, 828, and 830, matched and unmatched entities are assigned unique identifiers (unique alliance IDs). After matching has been performed, the data are stored in temp entity alliance/transaction databases 832 and 834 (temporary databases after matching performed).

At block 836, the workflow proceeds along one of three flow paths. First, at block 837, it is determined if the exact same entity already exists in the entity alliance database 838. If so, then the workflow proceeds via blocks 840 and 842.

Second, if the same blocking variables exist in the entity alliance database 838, the workflow proceeds via block 844, 846, and 848. At blocks 850, 852, and 853, comparison links for record pairs are generated and probabilities are determined based on an ECM binary classifier. At blocks 854, 856, 858, 860, 862, and 864, linked entities and unlinked entities are assigned unique identifiers, and the temp entity alliance/transaction databases 832 and 834 and the entity alliance/transaction databases 838 and 839 are updated.

Third, if the same entity does not already exist in the entity alliance database 838 and the same blocking variables do not exist in the entity alliance database 840, then the workflow proceeds to block 866. At block 868, for linked records (where the count is greater than one), the data are inserted from the temp entity alliance/transaction databases 832 and 834 into the entity alliance/transaction databases 838 and 839 because there is, at least, one link available. In contrast, at block 870, for non-linked records (where the count equals one), the data are inserted from the temp entity alliance/transaction databases 832 and 834 into the remain entity alliance/transaction databases 802 and 804. The data inserted into these remain entity alliance/transaction databases 802 and 804 will be reprocessed in the subsequent module (along with data that was filtered out at blocks 812 and 814).

Figure 13:
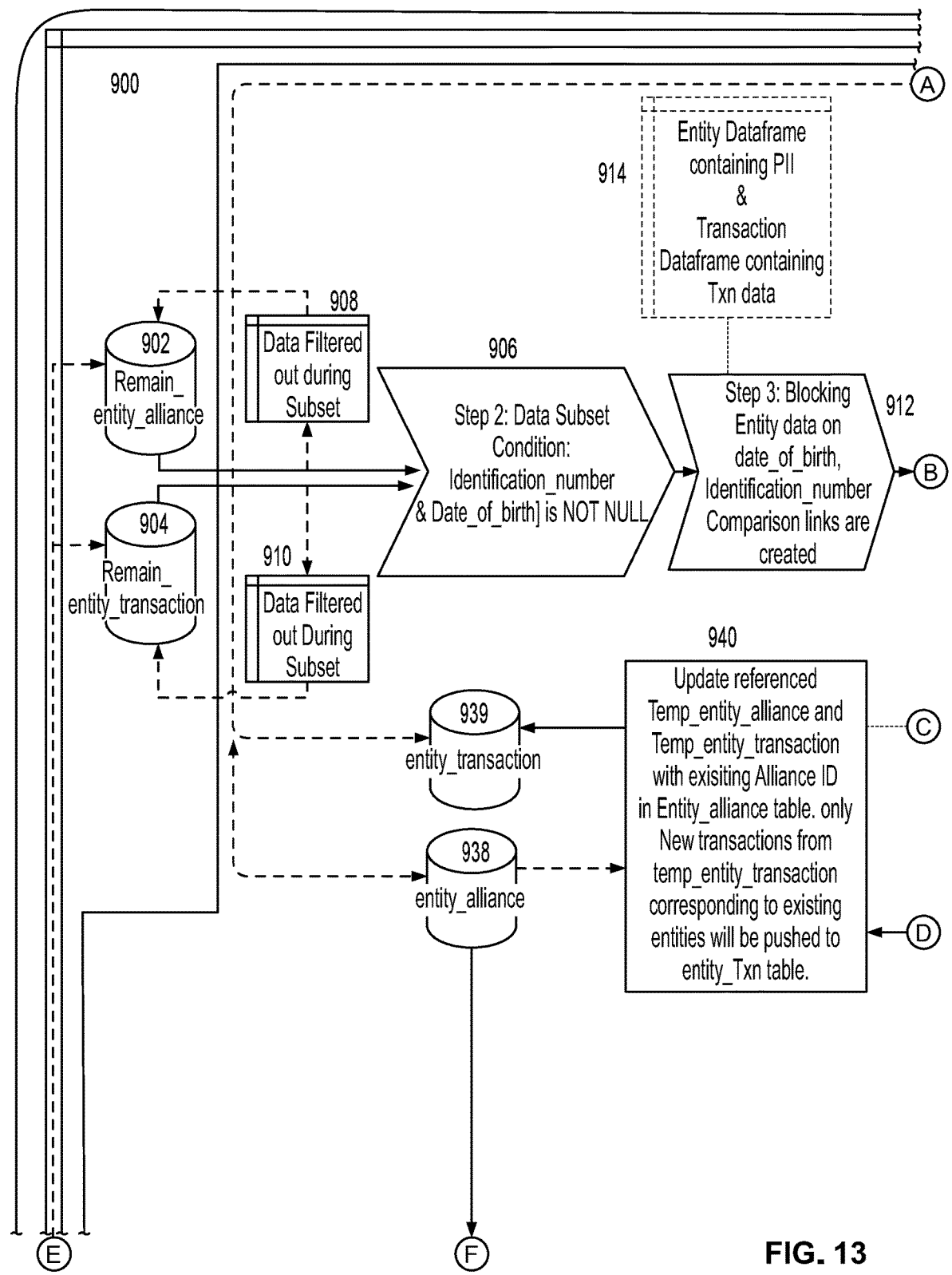
FIG. 13 is a flow diagram in accordance with some embodiments.
Figure 13:
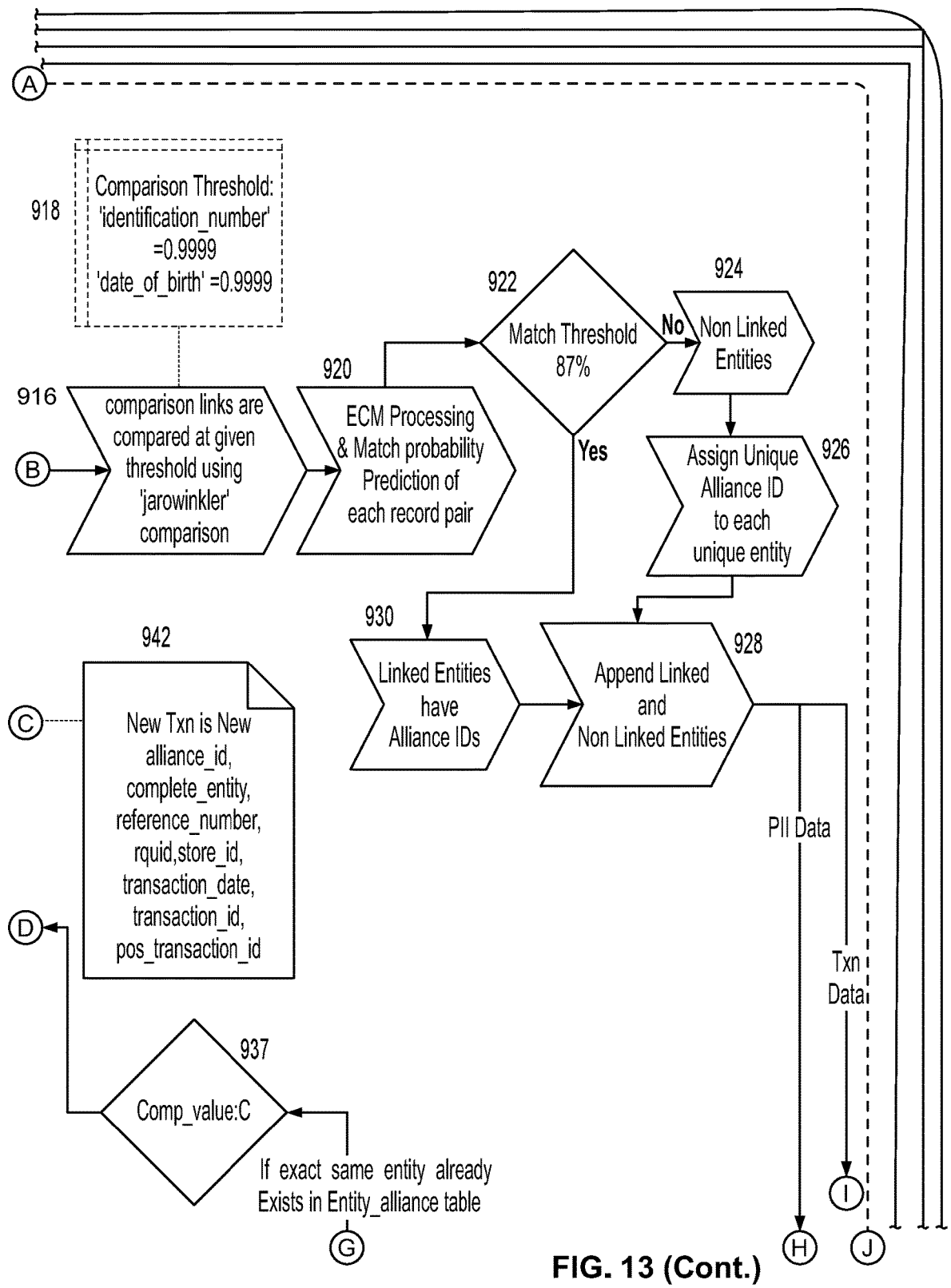
Figure 13:
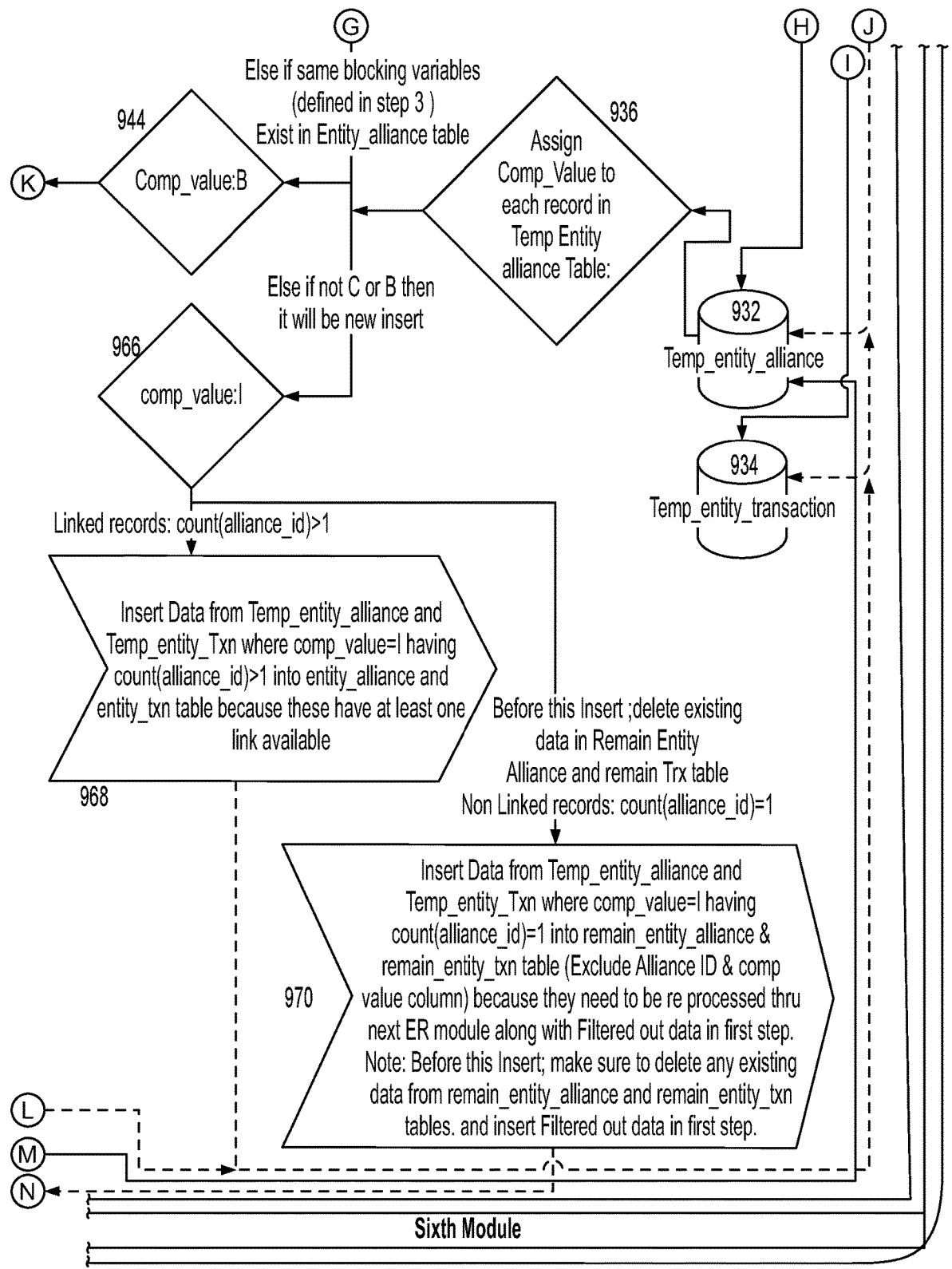

Referring to FIG. 13, the workflow proceeds to the sixth module 900 (which involves different subset conditions and blocking variables). Module 900 starts with the remain entity alliance database 902 and remain entity transaction 904 that hold the remaining data records to be compared. At block 906, the data subset condition is applied in which the identification number and the date of birth are not null. At blocks 908 and 910, data that does not meet the subset condition has been filtered out and remains in the databases 902 and 904 for future modules. At blocks 912 and 914, blocking is performed to limit the number of records, and the blocking considers records based on date of birth and identification number. At blocks 916, 918, and 920, comparison links for record pairs are generated and probabilities are determined based on an ECM binary classifier. At block 922, a match threshold has been selected (and in this instance is 87%) and is applied to categorize the record pairs as matching or not matching. At blocks 924, 926, 928, and 930, matched and unmatched entities are assigned unique identifiers (unique alliance IDs). After matching has been performed, the data are stored in temp entity alliance/transaction databases 932 and 934 (temporary databases after matching performed).

At block 936, the workflow proceeds along one of three flow paths. First, at block 937, it is determined if the exact same entity already exists in the entity alliance database 938. If so, then the workflow proceeds via blocks 940 and 942.

Second, if the same blocking variables exist in the entity alliance database 938, the workflow proceeds to blocks 944, 962, and 964. At block 962, temp entity alliance/transaction databases 932 and 934 are updated with existing unique identifiers (unique alliance IDs) in the entity alliance database 938. At block 964, data are inserted from the temp entity alliance/transaction databases 932 and 934 into the entity alliance/transaction databases 938 and 939.

Third, if the same entity does not already exist in the entity alliance database 938 and the same blocking variables do not exist in the entity alliance database 940, then the workflow proceeds to block 966. At block 968, for linked records (where the count is greater than one), the data are inserted from the temp entity alliance/transaction databases 932 and 934 into the entity alliance/transaction databases 938 and 939 because there is, at least, one link available. In contrast, at block 970, for non-linked records (where the count equals one), the data are inserted from the temp entity alliance/transaction databases 932 and 934 into the remain entity alliance/transaction databases 902 and 904. The data inserted into these remain entity alliance/transaction databases 902 and 904 will be reprocessed in the subsequent module (along with data that was filtered out at blocks 912 and 914).

Figure 14:
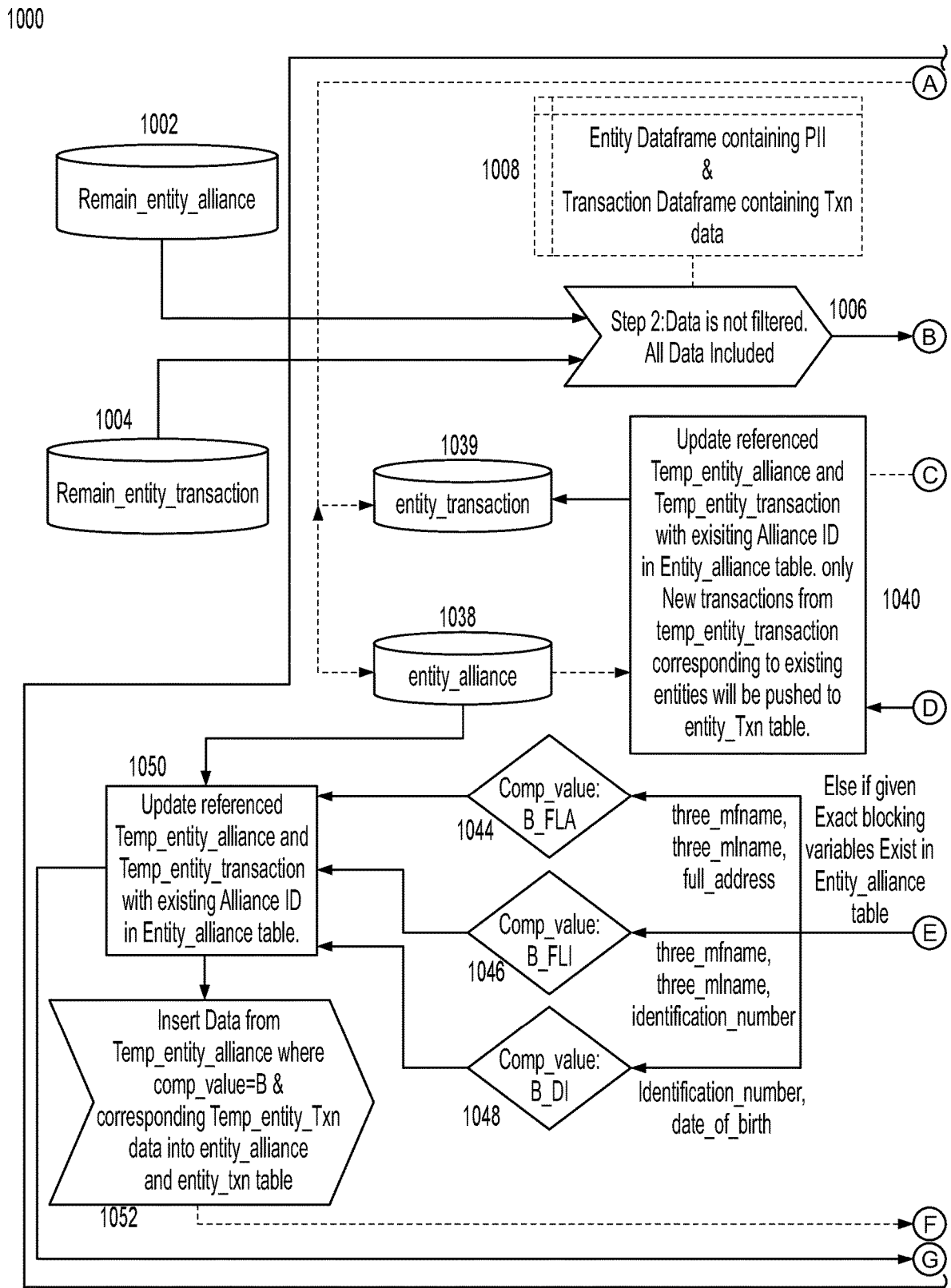
FIG. 14 is a flow diagram in accordance with some embodiments.
Figure 14:
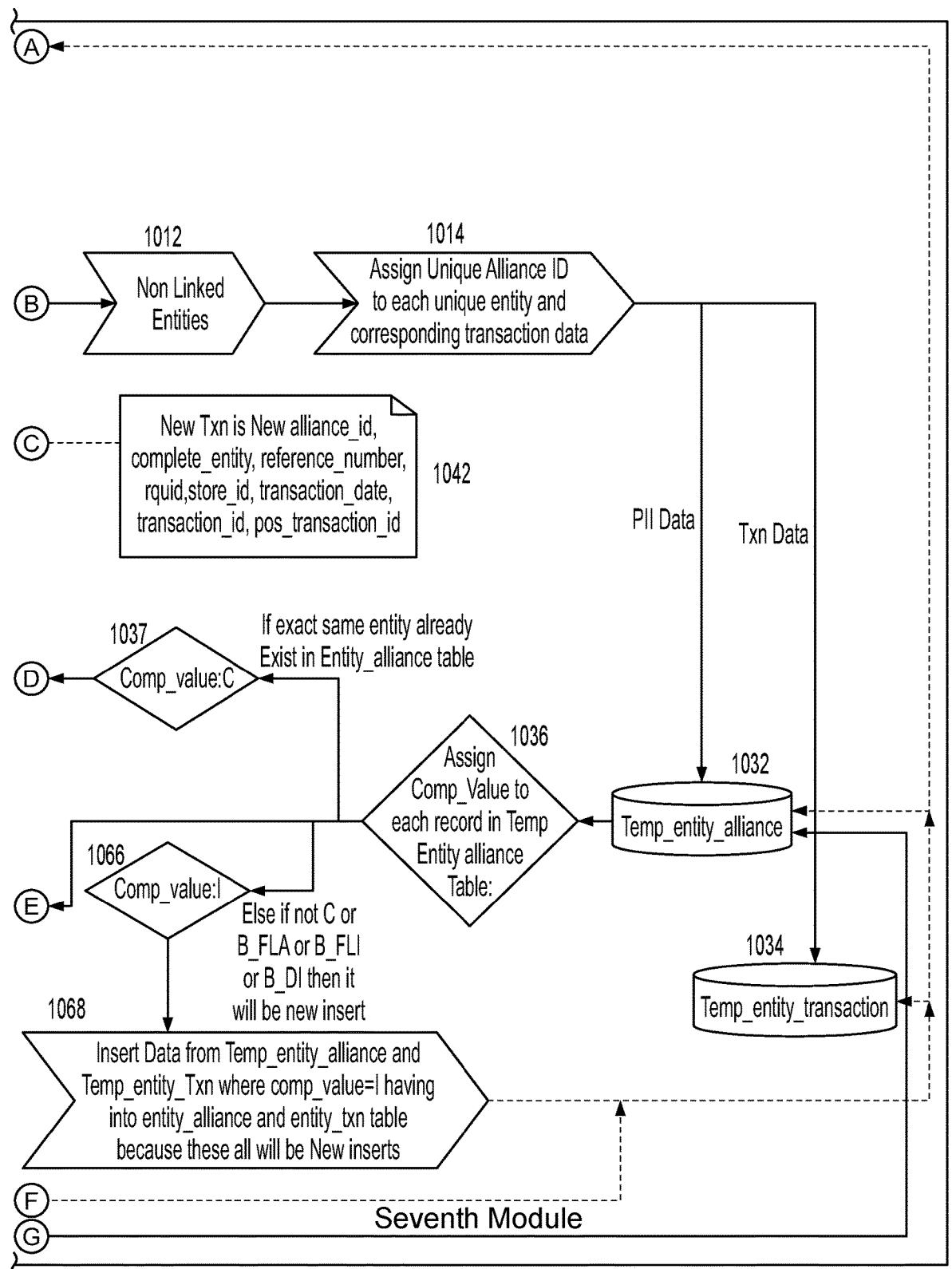

Referring to FIG. 14, the workflow proceeds to the seventh module 1000. Module 1000 starts with the remain entity alliance database 1002 and remain entity transaction 1004 that hold the remaining data records to be compared. The workflow proceeds via blocks 1006 and 1008. At block 1006, the data are not filtered and no subset conditions are applied (unlike previous modules). Instead, all data are included, and no blocking is performed. At blocks 1010 and 1012, the remaining, non-linked entities (and corresponding transaction data) are assigned unique identifiers (unique alliance IDs). The data are stored in temp entity alliance/transaction databases 1032 and 1034 (temporary databases).

At block 1036, the workflow proceeds along one of three flow paths. First, at block 1037, it is determined if the exact same entity already exists in the entity alliance database 1038. If so, then the workflow proceeds via blocks 1040 and 1042. At block 1040, references in the temp entity alliance/transaction databases 1032 and 1034 are updated with existing unique identifiers.

Second, if the same blocking variables exist in the entity alliance database 1038, the workflow proceeds to blocks 1044, 1046, 1048. At these three blocks, the following respective comparisons are made based on: (1) the first three letters of the metaphones of the first and last names and full address; (2) the first three letters of the metaphones of the first and last names and identification number; and (3) identification number and date of birth. At block 1050, references in the temp entity alliance/transaction databases 1032 and 1034 are updated with existing unique identifiers in the entity alliance database 1038. At block 1052, data are inserted from the temp entity alliance/transaction databases 1032 and 1034 into the entity alliance/transaction databases 1038 and 1039.

Third, if the same entity does not already exist in the entity alliance database 938 and the comparisons at blocks 1044, 1046, and 1048 are not applicable, then the workflow proceeds to block 1066. At block 1068, these data will be new inserts. So, the data are inserted from the temp entity alliance/transaction databases 1032 and 1034 into the entity alliance/transaction databases 1038 and 1039. At this stage, it is generally contemplated that everything is now in the entity alliance/transaction databases 1038 and 1039 with linking, unique identifiers.

Figure 15:
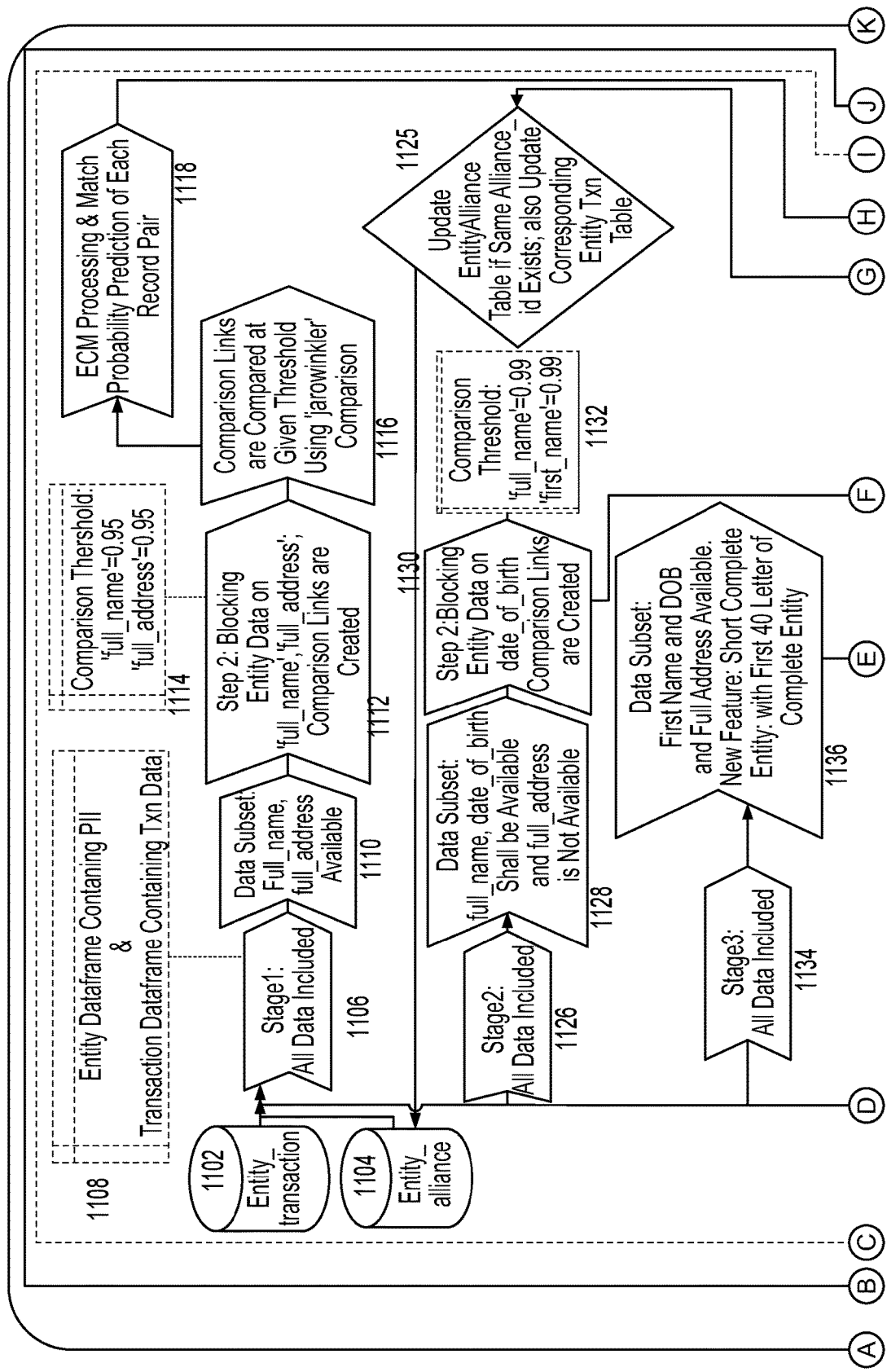
FIG. 15 is a flow diagram in accordance with some embodiments.
Figure 15:
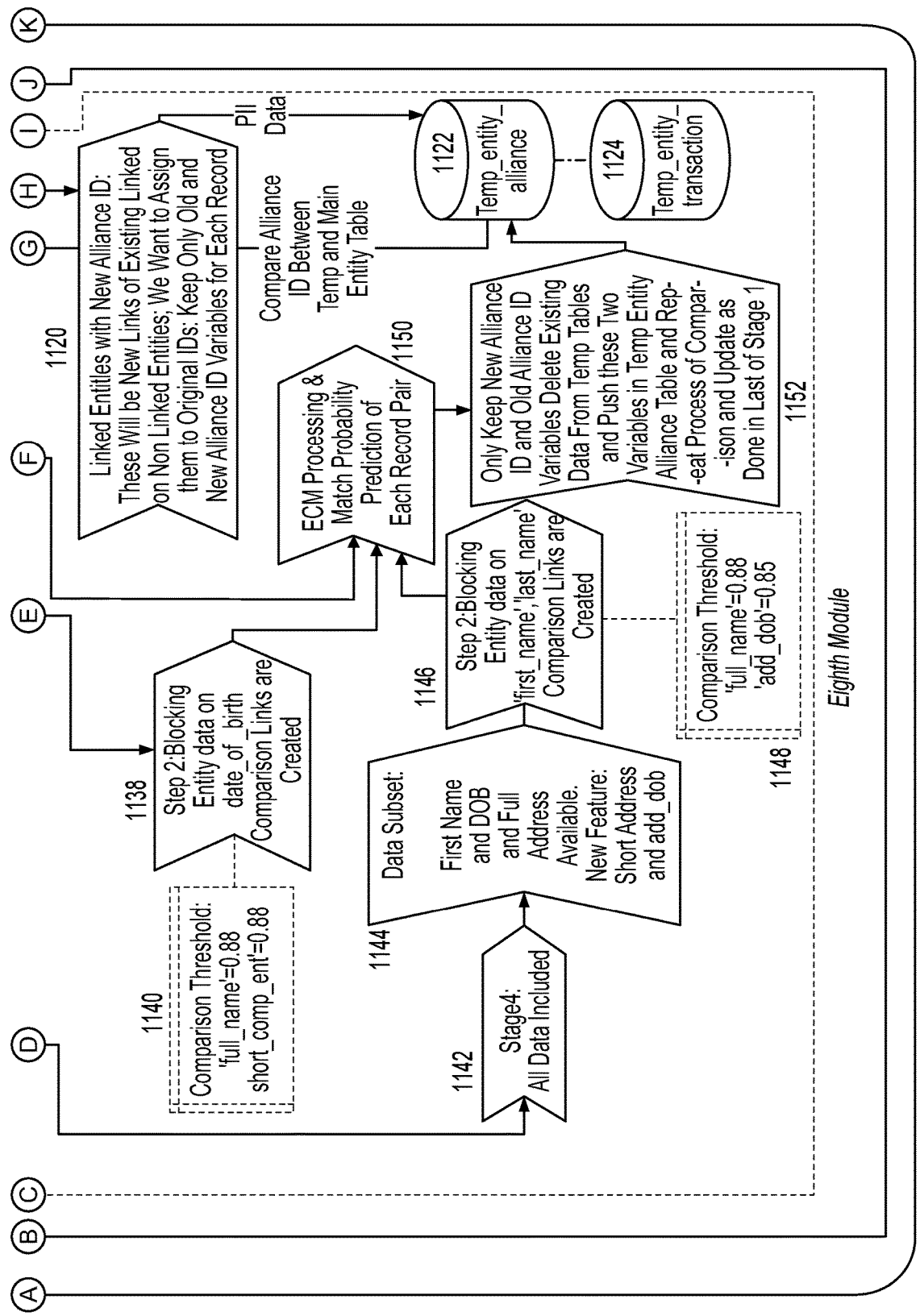

Referring to FIG. 15, the workflow proceeds to the eighth module 1100. In one aspect, this module 1100 determines whether there may be new links for existing linked and non-linked entities, which will then be linked together and assigned a corresponding unique identifier. Module 1100 starts with the entity alliance database 1102 and entity transaction database 1104 (not the remain databases) that hold the data records. FIG. 15 shows four stages. The first stage starts at blocks 1106 and 1108. In stage 1, at block 1110, the data subset is applied in which the full name and full address are available. At blocks 1112 and 1114, blocking is performed and considers entity records based on date of birth and identification number. At blocks 1116 and 1118 comparison links for record pairs are generated and probabilities are determined based on an ECM binary classifier. At block 1120, new links for existing linked and non-linked entities will be assigned a corresponding unique identifier. The data are stored in temp entity alliance/transaction databases 1122 and 1124. At block 1125, the unique identifier (alliance ID) of the temp entity database 1122 is compared with the entity alliance database 1102, and the entity alliance database 1102 (and the corresponding entity transaction database 1104) are updated.

Stages 2, 3, and 4 involve comparisons based on different data subsets and blocking variables. At stage 2, at blocks 1126, 1128, 1130, and 1132, for the data subset, the full name and date of birth are available but the full address is not available; blocking considers entity data based on date of birth; and comparison links are created. At stage 3, at blocks 1134, 1136, 1138, and 1140, for the data subset, the first name, date of birth, and full address are available (and a shortened version of the complete entity may be applied); blocking considers entity data based on date of birth; and comparison links are created. At stage 4, at blocks 1142, 1144, 1146, and 1148, for the data subset, the first name, date of birth, and full address are available (and a short address may be applied); blocking considers entity data based on first name and last name; and comparison links are created. At block 1150, match probabilities are determined based on an ECM binary classifier. At block 1152, existing data at the temp entity alliance/transaction databases 1122 and 1124 is processed, and data are compared and updated in block 1125.

In this form, it is contemplated that the modules are preferably performed in the above order. It will be understood that, in other forms, the modules may be executed in a different order. Further, in other forms, some modules may be omitted while other modules may be added.

Figure 16:
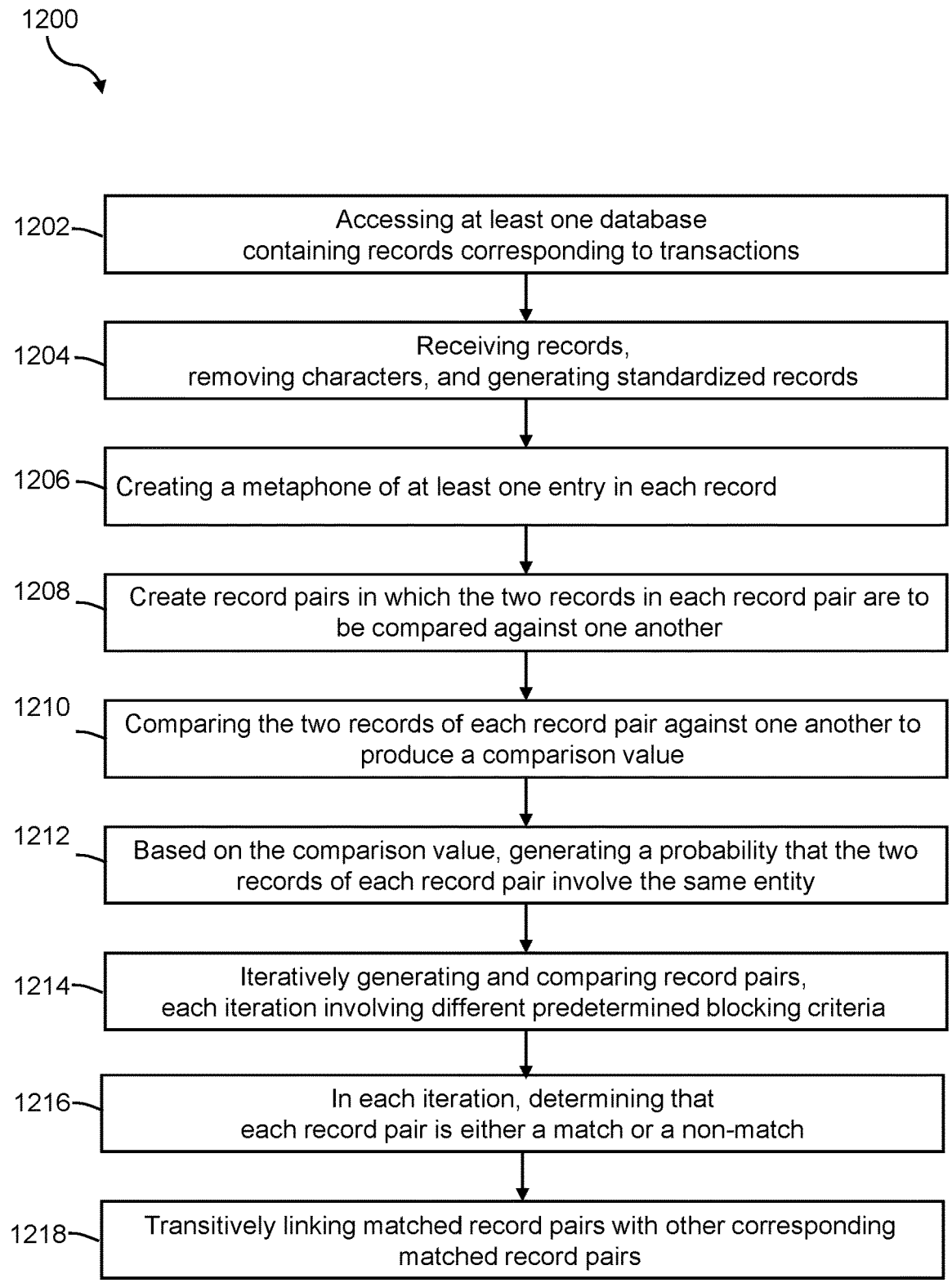
FIG. 16 is a flow diagram in accordance with some embodiments.

Referring to FIG. 16, there is shown a process 1200 for determining an entity involved in multiple transactions. In one form, it is contemplated that the process 1200 is performed with identifying an individual involved in multiple financial transactions over a certain time period. For example, it may be used to determine whether an individual is involved in multiple financial transactions totaling more than a certain amount (such as $10,000) during a certain time period (such as one day). Further, this process 1200 may use and incorporates the systems, components, and modules described above and shown in FIGS. 1-14.

At block 1202, at least one database is accessed containing a plurality of records corresponding to a plurality of transactions. Each record includes a plurality of fields relating to a nominal entity involved in the corresponding transaction. This may be raw data. At block 1204, as part of data ingestion, records are received from the at least one database, characters from a first set of entries in the records are removed, and standardized records for a second set of entries in the records are generated. It is generally contemplated that this is part of a data cleaning and standardization approach to facilitate comparisons between records for determining matching entities.

At block 1206, a metaphone is created of at least one entry in each record, and the metaphone approximates how the at least one entry sounds. In one form, metaphones of first and/or last names are used in blocking to limit records that are compared against one another. Further, in some forms, only part of the metaphones (such as the first three letters) are used in blocking. At block 1208, a plurality of record pairs is created in which the two records in each record pair are to be compared against one another. The total number of record pairs is determined by predetermined blocking criteria to limit a total number of comparisons based on predetermined fields (which may involve the use of metaphones of record entries).

At block 1210, the two records of each record pair are compared against one another to produce a comparison value indicating a degree of similarity between the two records. In one example, the Jaro-Winkler distance method may be used to generate the comparison values. At block 1212, based on the comparison value, a probability is generated that the two records of each record pair involve the same entity. In one example, an ECM binary classifier approach may be used to generate this probability. It is generally contemplated that unsupervised and supervised machine learning approaches may be used. Regarding supervised machine learning, it is contemplated that past data sets where the actual entity matches are known can be used as training data sets.

At block 1214, record pairs are iteratively compared, each iteration involving application of different predetermined blocking criteria corresponding to one or more fields to determine the record pairs. For example, as described earlier, the process 1200 may involve multiple modules that are executed in a certain order in which different blocking criteria are used to determine the record pairs for each module. At block 1216, in each iteration, it is determined that each record pair is either a match or a non-match based on comparison of each probability to a predetermined threshold probability. At block 1218, matched record pairs are transitively linked with other corresponding matched record pairs to determine a group of record pairs involving the same entity. In other words, record pairs that are directly and indirectly matching are linked to one another. The entities involved in each grouping of linked record pairs may be assigned a unique identifier.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for determining an entity involved in multiple transactions, the system comprising:

at least one database containing a plurality of records corresponding to a plurality of transactions, each record including a plurality of fields relating to a nominal entity involved in the corresponding transaction, each record including a first field comprising a first name and a second field comprising a last name;

one or more memory devices configured to store a set of instructions; and a control circuit comprising one or more processors configured to execute the set of instructions that cause the one or more processors to:

receive records from the at least one database and generate standardized fields in the records;

remove characters from name entries in name fields and generate standardized address entries in address fields;

for each record, create a first metaphone of an entry in the first field and a second metaphone of an entry in the second field, each metaphone approximating how the entry sounds when pronounced and applied to limit a total number of records being compared to one another, each metaphone composed of letters and constituting a shorthand approximation of how the entry sounds when pronounced, each metaphone having a predetermined maximum number of letters or fewer letters;

generate a subset of records in which at least first metaphones of the records are the same and in which second metaphones of the records are the same, the subset of records being generated to limit a total number of comparisons between records;

create a plurality of record pairs by pairing each record of the subset of records with each of the other records in the subset of records;

compare string sequences of fields of each of the two records of each record pair against one another to produce a comparison value indicating a degree of similarity between the two records;

based on the comparison value, generate a probability that the two records of each record pair involve a same entity;

compare the generated probability of each record pair against a threshold probability;

determine that a record pair is a match if the generated probability exceeds the threshold probability;

transitively link records of record pairs that directly and indirectly match one another to identify records of a common entity;

assign a unique identifier for each different entity, each unique identifier being assigned to each record in matched record pairs that are transitively linked to one another;

identify all transactions corresponding to the same entity based on each unique identifier, the transactions being financial transactions;

total an amount of the transactions corresponding to the same entity; and generate an alert when the total amount exceeds a predetermined threshold during a predetermined time period.

2. The system of claim 1, wherein the set of instructions, when executed, further cause the system to:

iteratively generate and compare record pairs, each iteration involving creation of a subset of records based on a comparison of a metaphone of the first name, a metaphone of the last name, and one or more predetermined fields to generate the subset of records, a plurality of record pairs being created by pairing each record of the subset of records with each of the other records in the subset of records;

in each iteration, determine that each record pair is either a match or a non-match based on comparison of each probability to a predetermined threshold probability; and in each iteration, transitively link matched record pairs with other corresponding matched record pairs to determine a group of record pairs involving the same entity.

3. The system of claim 2, wherein the set of instructions, when executed, further cause the system to, in a first iteration:

determine records having entries in first name, last name, address, and date of birth fields;

compare the metaphone of the first name, the metaphone of the last name, and date of birth in the records to generate a first subset of records;

create a plurality of record pairs by pairing each record of the first subset of records with each of the other records in the first subset of records; and generate a probability that two records of each record pair involve the same entity.

4. The system of claim 3, wherein the set of instructions, when executed, further cause the system to, in a second iteration:

determine records having entries in first name, last name, and address fields;

compare the metaphone of the first name, the metaphone of the last name, and address in the records to generate a second subset of records;

create a plurality of record pairs by pairing each record of the second subset of records with each of the other records in the second subset of records; and generate a probability that two records of each record pair involve the same entity.

5. The system of claim 4, wherein the set of instructions, when executed, further cause the system to, in a third iteration:

determine records having entries in first name, last name, and identification number fields;

compare the metaphone of the first name, the metaphone of the last name, and identification number in the records to generate a third subset of records;

create a plurality of record pairs by pairing each record of the third subset of records with each of the other records in the third subset of records; and generate a probability that two records of each record pair involve the same entity.

6. The system of claim 5, wherein the set of instructions, when executed, further cause the system to, in a fourth iteration:

determine records having entries in first name, last name, identification number, date of birth, and address fields;

compare the metaphone of the first name, the metaphone of the last name, identification number, date of birth, and address in the records to generate a fourth subset of records;

create a plurality of record pairs by pairing each record of the fourth subset of records with each of the other records in the fourth subset of records; and generate a probability that two records of each record pair involve the same entity.

7. A method for determining an entity involved in multiple transactions, the method comprising, by a control circuit comprising one or more processors configured to execute a set of instructions stored in one or more memory devices:

accessing at least one database containing a plurality of records corresponding to a plurality of transactions, each record including a plurality of fields relating to a nominal entity involved in the corresponding transaction, each record including a first field comprising a first name and a second field comprising a last name;

receiving records from the at least one database and generating standardized fields in the records;

removing characters from name entries in name fields and generating standardized address entries in address fields;

for each record, creating a first metaphone of an entry in the first field and a second metaphone of an entry in the second field, each metaphone approximating how the entry sounds when pronounced and applied to limit a total number of records being compared to one another, each metaphone composed of letters and constituting a shorthand approximation of how the entry sounds when pronounced, each metaphone having a predetermined maximum number of letters or fewer letters;

generating a subset of records in which first metaphones of the records are the same and in which second metaphones of the records are the same, the subset of records being generated to limit a total number of comparisons between records;

creating a plurality of record pairs by pairing each record of the subset of records with each of the other records in the subset of records;

comparing string sequences of fields of each of the two records of each record pair against one another to produce a comparison value indicating a degree of similarity between the two records;

based on the comparison value, generating a probability that the two records of each record pair involve a same entity;

comparing the generated probability of each record pair against a threshold probability;

determining that a record pair is a match if the generated probability exceeds the threshold probability;

transitively linking records of record pairs that directly and indirectly match one another to identify records of a common entity;

assigning a unique identifier for each different entity, each unique identifier being assigned to each record in matched record pairs that are transitively linked to one another;

identifying all transactions corresponding to the same entity based on each unique identifier, the transactions being financial transactions;

totaling an amount of the transactions corresponding to the same entity; and generating an alert when the total amount exceeds a predetermined threshold during a predetermined time period.

8. The method of claim 7, further comprising, by the control circuit:

iteratively generating and comparing record pairs, each iteration involving creation of a subset of records based on a comparison of a metaphone of the first name, a metaphone of the last name, and one or more predetermined fields to generate the subset of records, a plurality of record pairs being created by pairing each record of the subset of records with each of the other records in the subset of records;

in each iteration, determining that each record pair is either a match or a non-match based on comparison of each probability to a predetermined threshold probability; and in each iteration, transitively linking matched record pairs with other corresponding matched record pairs to determine a group of record pairs involving the same entity.

9. The method of claim 8, further comprising, by the control circuit, in a first iteration:

determining records having entries in first name, last name, address, and date of birth fields;

comparing the metaphone of the first name, the metaphone of the last name, and date of birth in the records to generate a first subset of records;

creating a plurality of record pairs by pairing each record of the first subset of records with each of the other records in the first subset of records; and generating a probability that two records of each record pair involve the same entity.

10. The method of claim 9, further comprising, by the control circuit, in a second iteration:

determining records having entries in first name, last name, and address fields;

comparing the metaphone of the first name, the metaphone of the last name, and address in the records to generate a second subset of records;

creating a plurality of record pairs by pairing each record of the second subset of records with each of the other records in the second subset of records; and generating a probability that two records of each record pair involve the same entity.

11. The method of claim 10, further comprising, by the control circuit, in a third iteration:

determining records having entries in first name, last name, and identification number fields;

comparing the metaphone of the first name, the metaphone of the last name, and identification number in the records to generate a third subset of records;

creating a plurality of record pairs by pairing each record of the third subset of records with each of the other records in the third subset of records; and generating a probability that two records of each record pair involve the same entity.

12. The method of claim 11, further comprising, by the control circuit, in a fourth iteration:

determining records having entries in first name, last name, identification number, date of birth, and address fields;

comparing the metaphone of the first name, the metaphone of the last name, identification number, date of birth, and address in the records to generate a fourth subset of records;

creating a plurality of record pairs by pairing each record of the fourth subset of records with each of the other records in the fourth subset of records; and generating a probability that two records of each record pair involve the same entity.

* * * * *